United States Patent
Maiyuran et al.

(10) Patent No.: US 12,516,362 B2
(45) Date of Patent: Jan. 6, 2026

(54) FILAMENTOUS FUNGAL HOST CELLS

(71) Applicant: Novozymes A/S, Bagsvaerd (DK)

(72) Inventors: Suchindra Maiyuran, Gold River, CA (US); Sarah McFarland, Davis, CA (US)

(73) Assignee: Novozymes A/S, Bagsvaerd (DK)

( * ) Notice: Subject to any disclaimer, the term of this patent is extended or adjusted under 35 U.S.C. 154(b) by 1013 days.

(21) Appl. No.: 17/296,932

(22) PCT Filed: Nov. 26, 2019

(86) PCT No.: PCT/US2019/063459
§ 371 (c)(1),
(2) Date: May 25, 2021

(87) PCT Pub. No.: WO2020/112911
PCT Pub. Date: Jun. 4, 2020

(65) Prior Publication Data
US 2022/0025422 A1 Jan. 27, 2022

Related U.S. Application Data

(60) Provisional application No. 62/772,537, filed on Nov. 28, 2018.

(51) Int. Cl.
| | | |
|---|---|---|
| *C12P 21/02* | (2006.01) | |
| *C07K 14/37* | (2006.01) | |
| *C12N 15/80* | (2006.01) | |
| *C12R 1/885* | (2006.01) | |

(52) U.S. Cl.
CPC ............. *C12P 21/02* (2013.01); *C07K 14/37* (2013.01); *C12N 15/80* (2013.01); *C12R 2001/885* (2021.05)

(58) Field of Classification Search
CPC ......... C12P 21/02; C07K 14/37; C12N 15/80; C12R 2001/885
See application file for complete search history.

(56) References Cited

U.S. PATENT DOCUMENTS

| | | |
|---|---|---|
| 2001/0034045 A1 | 10/2001 | Penttila et al. |
| 2005/0022266 A1 | 1/2005 | Wu et al. |
| 2010/0221775 A1 | 9/2010 | Penttila et al. |

FOREIGN PATENT DOCUMENTS

| | | |
|---|---|---|
| KR | 20130018401 A | 2/2013 |
| WO | 2018015443 A1 | 1/2018 |

OTHER PUBLICATIONS

Saloheimo et al (2012, Microbiology, DOI 10.1099/mic.0.053132-0, cited on the attached Form PTO-892; herein referred to as Saloheimo). (Year: 2012).*
K Singh, Raushan, et al. "Protein engineering approaches in the post-genomic era." Current Protein and Peptide Science 19.1 (2018): 5-15. (Year: 2018).*
Zhang, Meiling, David A. Case, and Jeffrey W. Peng. "Propagated perturbations from a peripheral mutation show interactions supporting WW domain thermostability." Structure 26.11 (2018): 1474-1485. (Year: 2018).*
Saloheimo et al (2012, Microbiology, DOI 10.1099/mic.0.053132-0, cited on PTO-892 mailed Oct. 21, 2024; herein referred to as Saloheimo) (Year: 2012).*
Howard et al, 1995, J Cell Biochem Suppl 19B, 209.
Valkonen et al, 2003, Appl Environ Microbiol 69(12), 6979-6986.
Valkonen et al, 2004, Mol Genet Genom 272(4), 443-451.
KR20130018401A—Bahn et al., 2013, Abstract.
Martinez et al., 2014, NCBI Reference Sequence XP_006962552.1.
Saloheimo et al., Microbiology, 2012, 46-57, 158.

* cited by examiner

*Primary Examiner* — Manjunath N Rao
*Assistant Examiner* — Erica Nicole Jones-Foster
(74) *Attorney, Agent, or Firm* — Eric J. Fechter

(57) ABSTRACT

The present invention relates to an isolated variant Ire1 polypeptide, comprising (a) an amino acid substitution at position 153 of the *Trichoderma reesei* Ire1 polypeptide of SEQ ID NO: 2; or (b) an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2. The present invention also relates to a recombinant filamentous fungal host cell comprising the mutated ire1 gene encoding the variant Ire1 polypeptide for producing a secreted heterologous polypeptide of interest, a method for producing the secreted heterologous polypeptide of interest in the recombinant filamentous fungal host cell, and a method of improving the productivity or yield of the secreted heterologous polypeptide of interest in the recombinant filamentous fungal host cell.

20 Claims, 4 Drawing Sheets
Specification includes a Sequence Listing.

FILAMENTOUS FUNGAL HOST CELLS

CROSS-REFERENCE TO RELATED APPLICATIONS

This application is a 35 U.S.C. 371 national application of PCT/US2019/063459, filed Nov. 26, 2019, which claims priority or the benefit from U.S. Provisional Application Ser. No. 62/772,537, filed Nov. 28, 2018. The contents of these applications are fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to a filamentous fungal host cell comprising a variant Ire1 polypeptide that improves productivity and/or yield of a polypeptide of interest.

Description of the Related Art

Filamentous fungi are useful as host cells for the recombinant production of heterologous polypeptides having biological activity such as enzymes and other valuable proteins. For industrial and commercial purposes, protein productivity of such filamentous fungal host cells is an important factor of production costs.

The unfolded protein response signal transducer Ire1p promotes secretion of heterologous proteins in yeast (Howard et al. 1995, *J. Cell. Biochem*. Suppl. No. 19B, p. 209). Ire1p is an endoplasmic reticulum (ER) stress sensor in all eukaryotes, and catalyzes the splicing of hac1 mRNA in yeast, bZIP60 in plants and xbp1 in metazoans. Hac and its orthologues act as transcriptional activators for transcription of unfolded protein response (UPR) related genes which have important roles for efficient expression of not only endogenous but also exogenous or recombinant proteins.

WO 2018/015443 discloses a mutated *Aspergillus niger* ireA gene encoding a variant IreA polypeptide comprising amino acid substitutions at positions 81 and 84.

There is a need in the art for alternatives for increasing the secretion of a heterologous protein in a filamentous fungal host cell.

The present invention provides a variant Ire1 polypeptide that improves productivity and/or yield of a secreted heterologous polypeptide of interest by a filamentous fungal host cell.

SUMMARY OF THE INVENTION

The present invention relates to an isolated variant Ire1 polypeptide, comprising (a) an amino acid substitution at position 153 of the *Trichoderma reesei* Ire1 polypeptide of SEQ ID NO: 2; or (b) an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

The present invention also relates to an isolated polynucleotide, comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

The present invention also relates to a recombinant filamentous fungal host cell, comprising and expressing a first polynucleotide encoding a heterologous polypeptide of interest and a second polynucleotide comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

The present invention also relates to a method of producing a secreted heterologous polypeptide of interest, said method comprising the steps of:
(a) cultivating such a recombinant filamentous fungal host cell under conditions suitable for the production and secretion of the heterologous polypeptide; and, optionally
(b) recovering the secreted heterologous polypeptide of interest.

The present invention further relates to a method of improving the productivity or yield of a secreted heterologous polypeptide of interest in a filamentous fungal host cell, said method comprising the steps of:
(a) providing a filamentous fungal host cell comprising and expressing an ire1 gene encoding an Ire1 polypeptide; and
(b) mutating the ire1 gene to provide a mutated ire1 gene that encodes a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2, wherein the productivity or yield of a secreted heterologous polypeptide of interest is improved.

DEFINITIONS

Figure 1:
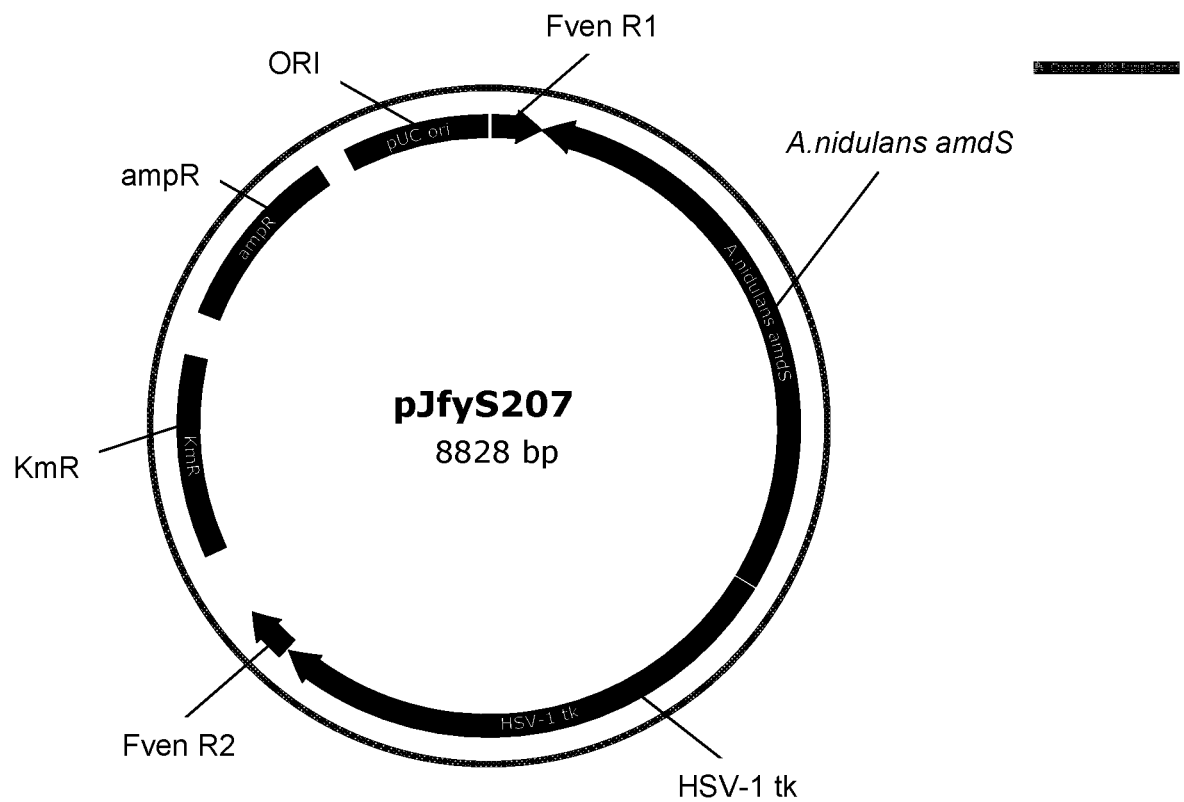
FIG. 1 shows a map of plasmid pJfyS207.

In accordance with this detailed description, the following definitions apply. Note that the singular forms "a," "an," and "the" include plural references unless the context clearly dictates otherwise.

Reference to "about" a value or parameter herein includes aspects that are directed to that value or parameter per se. For example, description referring to "about X" includes the aspect "X".

Unless defined otherwise or clearly indicated by context, all technical and scientific terms used herein have the same meaning as commonly understood by one of ordinary skill in the art to which this invention belongs.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Coding sequence: The term "coding sequence" means a polynucleotide, which directly specifies the amino acid sequence of a polypeptide. The boundaries of the coding sequence are generally determined by an open reading frame, which begins with a start codon, such as ATG, GTG, or TTG, and ends with a stop codon, such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a polypeptide. Each control sequence may be native (i.e., from the same gene) or heterologous (i.e., from a different gene) to the polynucleotide encoding the polypeptide or native or heterologous to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Expression: The term "expression" means any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Heterologous: The term "heterologous" means, with respect to a host cell, that a polypeptide or nucleic acid is not naturally occurring in the host cell. The term "heterologous" means, with respect to a polypeptide or nucleic acid, that a control sequence, e.g., promoter, or domain of a polypeptide or nucleic acid is not naturally associated with the polypeptide or nucleic acid, i.e., the control sequence is from a gene other than the gene encoding the polypeptide.

Host cell: The term "host cell" means any microbial cell into which a nucleic acid construct or expression vector comprising a polynucleotide has been introduced. Methods for introduction include but are not limited to protoplast fusion, transfection, transformation, electroporation, conjugation, and transduction. In some embodiments, the host cell is an isolated recombinant host cell that is partially or completely separated from at least one other component with, including but not limited to, for example, proteins, nucleic acids, cells, etc.

Inositol-requiring enzyme 1 (Ire1): The term "inositol-requiring enzyme 1" or "Ire1" or "Ire1 polypeptide" is a transmembrane protein kinase that functions as a sensor of incorrectly folded (misfolded) proteins in the endoplasmic reticulum (ER) and triggers an intracellular signaling pathway termed the unfolded protein response (UPR). The UPR is an ER stress response that is conserved from yeast to mammals and activates genes involved in degrading misfolded proteins, regulating protein synthesis and activating molecular chaperones, to restore homeostasis in the ER (Sidrauski et al., 1998, *Trends Cell. Biol.* 8: 245-249; Kauman, 1999, *Genes Dev.* 13: 1211-1233; Welihinda et al., 1999, *Gene Expr.* 7: 293-300). IRE1 contains an ER luminal domain, which is involved in the recognition of misfolded proteins, and cytoplasmic endoribonuclease and kinase domains, which are involved in the activation of downstream pathways (Sidrauski and Walther, 1997, *Cell* 90: 1031-1039) The activated IRE1 specifically mediates the unconventional splicing and activation of the stress response transcription factor Hac in yeast and filamentous fungi which in turn regulates the expression of ER chaperones and other target genes (Cox et al., 1993, *Cell* 73: 1197-1206; Kawahara et al., 1997, *Mol. Biol. Cell* 8: 1845-1862; Saloheimo et al., 2003, *Mol. Microbiol.* 47(4): 1149-1161).

Isolated: The term "isolated" means a polypeptide, nucleic acid, cell, or other specified material or component that is separated from at least one other material or component with which it is naturally associated as found in nature, including but not limited to, for example, other proteins, nucleic acids, cells, etc. An isolated polypeptide includes, but is not limited to, a culture broth containing the secreted polypeptide.

Mature polypeptide: The term "mature polypeptide" means a polypeptide in its mature form following N-terminal processing (e.g., removal of signal peptide).

Mature polypeptide coding sequence: The term "mature polypeptide coding sequence" means a polynucleotide that encodes a mature polypeptide Native: The term "native" means a nucleic acid or polypeptide naturally occurring in a host cell.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Operably linked: The term "operably linked" means a configuration in which a control sequence is placed at an appropriate position relative to the coding sequence of a polynucleotide such that the control sequence directs expression of the coding sequence.

Recombinant: The term "recombinant," when used in reference to a cell, nucleic acid, protein or vector, means that it has been modified from its native state. Thus, for example, recombinant cells express genes that are not found within the native (non-recombinant) form of the cell, or express native genes at different levels or under different conditions than found in nature. Recombinant nucleic acids differ from a native sequence by one or more nucleotides and/or are operably linked to heterologous sequences, e.g., a heterologous promoter in an expression vector. Recombinant proteins may differ from a native sequence by one or more amino acids and/or are fused with heterologous sequences. A vector comprising a nucleic acid encoding a polypeptide is a recombinant vector. The term "recombinant" is synonymous with "genetically modified" and "transgenic".

Sequence identity: The relatedness between two amino acid sequences or between two nucleotide sequences is described by the parameter "sequence identity".

For purposes of the present invention, the sequence identity between two amino acid sequences is determined as the output of "longest identity" using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 6.6.0 or later. The parameters used are a gap open penalty of 10, a gap extension penalty of 0.5, and the EBLOSUM62 (EMBOSS version of BLOSUM62) substitution matrix. In order for the Needle program to report the longest identity, the -nobrief option must be specified in the command line. The output of Needle labeled "longest identity" is calculated as follows:

(Identical Residues×100)/(Length of Alignment−
    Total Number of Gaps in Alignment)

For purposes of the present invention, the sequence identity between two polynucleotide sequences is determined as the output of "longest identity" using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 6.6.0 or later. The parameters used are a gap open penalty of 10, a gap extension penalty of 0.5, and the EDNAFULL (EMBOSS version of NCBI NUC4.4) substitution matrix. In order for the Needle program to report the longest identity, the -nobrief option must be specified in the command line. The output of Needle labeled "longest identity" is calculated as follows:

(Identical Deoxyribonucleotides×100)/(Length of
    Alignment−Total Number of Gaps in Alignment)

Variant: The term "variant" means a polypeptide having biological activity comprising a man-made mutation, i.e., a substitution, insertion, and/or deletion (e.g., truncation), at one or more (e.g., several) positions. A substitution means replacement of the amino acid occupying a position with a different amino acid; a deletion means removal of the amino acid occupying a position; and an insertion means adding an amino acid adjacent to and immediately following the amino acid occupying a position.

Wild-type: The term "wild-type" in reference to an amino acid sequence or nucleic acid sequence means that the amino acid sequence or nucleic acid sequence is a native or naturally-occurring sequence. As used herein, the term "naturally-occurring" refers to anything (e.g., proteins, amino acids, or nucleic acid sequences) that is found in nature. Conversely, the term "non-naturally occurring" refers to anything that is not found in nature (e.g., recombinant nucleic acids and protein sequences produced in the laboratory or modification of the wild-type sequence).

Conventions for Designation of Variants

For purposes of the present invention, the Ire1 polypeptide disclosed in SEQ ID NO: 2 is used to determine the corresponding amino acid residue in another Ire1 polypeptide. The amino acid sequence of another Ire1 polypeptide is aligned with the Ire1 polypeptide disclosed in SEQ ID NO: 2, and based on the alignment, the amino acid position number corresponding to any amino acid residue in the Ire1 polypeptide disclosed in SEQ ID NO: 2 is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix.

Identification of the corresponding amino acid residue in another Ire1 polypeptide can be determined by alignment of multiple polypeptide sequences using several computer programs including, but not limited to, MUSCLE (multiple sequence comparison by log-expectation; version 3.5 or later; Edgar, 2004, *Nucleic Acids Research* 32: 1792-2797), MAFTT (version 6.857 or later; Katoh and Kuma, 2002, *Nucleic Acids Research* 30: 3059-3066; Katoh et al., 2005, *Nucleic Acids Research* 33: 511-518; Katoh and Toh, 2007, *Bioinformatics* 23: 372-374; Katoh et al., 2009, *Methods in Molecular Biology* 537: 39-64; Katoh and Toh, 2010, *Bioinformatics* 26: 1899-1900), and EMBOSS EMMA employing ClustalW (1.83 or later; Thompson et al., 1994, *Nucleic Acids Research* 22: 4673-4680), using their respective default parameters.

When another Ire1 polypeptide has diverged from the Ire1 polypeptide of SEQ ID NO: 2 such that traditional sequence-based comparison fails to detect their relationship (Lindahl and Elofsson, 2000, *J. Mol. Biol.* 295: 613-615), other pairwise sequence comparison algorithms can be used. Greater sensitivity in sequence-based searching can be attained using search programs that utilize probabilistic representations of polypeptide families (profiles) to search databases. For example, the PSI-BLAST program generates profiles through an iterative database search process and is capable of detecting remote homologs (Atschul et al., 1997, *Nucleic Acids Res.* 25: 3389-3402). Even greater sensitivity can be achieved if the family or superfamily for the polypeptide has one or more representatives in the protein structure databases. Programs such as GenTHREADER (Jones, 1999, *J. Mol. Biol.* 287: 797-815; McGuffin and Jones, 2003, *Bioinformatics* 19: 874-881) utilize information from a variety of sources (PSI-BLAST, secondary structure prediction, structural alignment profiles, and solvation potentials) as input to a neural network that predicts the structural fold for a query sequence. Similarly, the method of Gough et al., 2000, *J. Mol. Biol.* 313: 903-919, can be used to align a sequence of unknown structure with the superfamily models present in the SCOP database. These alignments can in turn be used to generate homology models for the polypeptide, and such models can be assessed for accuracy using a variety of tools developed for that purpose.

For proteins of known structure, several tools and resources are available for retrieving and generating structural alignments. For example, the SCOP superfamilies of proteins have been structurally aligned, and those alignments are accessible and downloadable. Two or more protein structures can be aligned using a variety of algorithms such as the distance alignment matrix (Holm and Sander, 1998, *Proteins* 33: 88-96) or combinatorial extension (Shindyalov and Bourne, 1998, *Protein Engineering* 11: 739-747), and implementation of these algorithms can additionally be utilized to query structure databases with a structure of interest in order to discover possible structural homologs (e.g., Holm and Park, 2000, *Bioinformatics* 16: 566-567).

In describing the variants of the present invention, the nomenclature described below for a substitution is adapted for ease of reference. The accepted IUPAC single letter or three letter amino acid abbreviation is employed.

For an amino acid substitution, the following nomenclature is used: Original amino acid, position, substituted amino acid. Accordingly, the substitution of alanine at position 153 with threonine is designated as "Ala153Thr" or "A153T".

DETAILED DESCRIPTION OF THE INVENTION

In one aspect, the present invention relates to an isolated variant Ire1 polypeptide, comprising (a) an amino acid substitution at position 153 of the *Trichoderma reesei* Ire1 polypeptide of SEQ ID NO: 2; or (b) an amino acid substitution at a position corresponding to position 153 of the *Trichoderma reesei* Ire1 of SEQ ID NO: 2 and has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

In another aspect, the present invention relates to an isolated polynucleotide, comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

In another aspect, the present invention relates to a method of improving the productivity or yield of a secreted heterologous polypeptide of interest in a filamentous fungal host cell, said method comprising the steps of:
(a) providing a filamentous fungal host cell comprising and expressing an ire1 gene encoding an Ire1 polypeptide; and
(b) mutating the ire1 gene to provide a mutated ire1 gene that encodes a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2, wherein the productivity or yield of a secreted heterologous polypeptide of interest is improved.

In an embodiment for each aspect above, the variant Ire1 polypeptide comprises or consists of an amino acid substitution at position 153 of the *Trichoderma reesei* Ire1 polypeptide of SEQ ID NO: 2. The amino acid at position 153 of the *Trichoderma reesei* Ire1 polypeptide of SEQ ID NO: 2 is substituted with arginine (Arg), asparagine (Asn), aspartic acid (Asp), cysteine (Cys), glycine (Gly), glutamic acid (Glu), glutamine (Gln), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr), or valine (Val). In a preferred embodiment for each aspect above, the amino acid at position 153 of the *Trichoderma reesei*Ire1 polypeptide of SEQ ID NO: 2 is substituted with Thr. In another preferred embodiment for each aspect above, the amino acid at position 153 of the *Trichoderma reesei* Ire1 polypeptide of SEQ ID NO: 2 is Ala, which is substituted with Thr.

In another embodiment for each aspect above, the variant Ire1 polypeptide comprises or consists of an amino acid substitution at a position corresponding to position 153 of the *Trichoderma reesei* Ire1 polypeptide of SEQ ID NO: 2 and has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2. The amino acid at a position corresponding to position 153 of the *Trichoderma reesei* Ire1 of SEQ ID NO: 2 is substituted with Ala, Arg, Asn, Asp, Cys, Gly, Glu, Gln, His, Iie, Leu, Lys, Met, Phe, Pro, Ser, Thr, Trp, Tyr, or Val. In a preferred embodiment for each aspect above, the amino acid at a position corresponding to position 153 of the *Trichoderma reesei* Ire1 polypeptide of SEQ ID NO: 2 is substituted with Thr. In another preferred embodiment for each aspect above, the amino acid at a position corresponding to position 153 of the *Trichoderma reesei* Ire1 polypeptide of SEQ ID NO: 2 is Ala, which is substituted with Thr.

In another embodiment for each aspect above, the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

In another embodiment for each aspect above, the nucleotide sequence of the mutated ire1 gene has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the *Trichoderma reesei* ire1 nucleotide sequence shown in SEQ ID NO: 1 or its cDNA sequence shown in SEQ ID NO: 3.

The Examples herein demonstrate that *T. reesei* SaMF128-2A11-1 (ire1 Ala153Thr mutant) produces a laccase from *Polyporus pinsitus* as a secreted heterologous polypeptide, where the productivity or yield of the *P. pinsitus* laccase was significantly and surprisingly increased in *T. reesei* SaMF128-2A11-1 relative to *Trichoderma reesei* FRT4New-8G4A (native ire1) by a single mutation in the ire1 gene resulting in the amino acid substitution Ala153Thr.

Polypeptides of Interest

The polypeptide of interest may be any secreted polypeptide heterologous (foreign) to the filamentous fungal host cell. The polypeptide may be encoded by a single gene or two or more genes. The term "polynucleotide encoding the polypeptide" will be understood to encompass one or more (several) genes involved in the production of the polypeptide. The term "heterologous polypeptide" is defined herein as a polypeptide that is not native to the filamentous fungal host cell; a native polypeptide in which structural modifications have been made to alter the native polypeptide, e.g., the protein sequence of a native polypeptide; or a native polypeptide whose expression is quantitatively altered as a result of a manipulation of the polynucleotide or host strain by recombinant DNA techniques, e.g., a stronger promoter, multiple copies of a DNA encoding the polypeptide. Thus, the present invention also encompasses, within the scope of the term "heterologous polypeptides," such recombinant production of native polypeptides, to the extent that such expression involves the use of genetic elements not native to the filamentous fungal host cell, or use of native elements that have been manipulated to function in a manner that do not normally occur in the host cell.

The polypeptide may be any polypeptide having a biological activity of interest. The term "polypeptide" is not meant herein to refer to a specific length of the encoded product and, therefore, encompasses peptides, oligopeptides, and proteins. The term "polypeptide" also encompasses two or more polypeptides combined to form the encoded product. Polypeptides also include fusion polypeptides, which comprise a combination of partial or complete polypeptide sequences obtained from at least two different polypeptides wherein one or more (several) may be heterologous to the filamentous fungal host cell. Polypeptides further include naturally occurring allelic and engineered variations of the above-mentioned polypeptides and hybrid polypeptides.

In one embodiment, the polypeptide is an antibody, an antigen, an antimicrobial peptide, an enzyme, a growth factor, a hormone, an immunodilator, a neurotransmitter, a receptor, a reporter protein, a structural protein, or a transcription factor.

In another embodiment, the polypeptide is an oxidoreductase, a transferase, a hydrolase, a lyase, an isomerase, or a ligase.

In another embodiment, the polypeptide is an acetylmannan esterase, acetyxylan esterase, aminopeptidase, alpha-amylase, arabinanase, arabinofuranosidase, beta-amylase, carbohydrase, carboxypeptidase, catalase, cellobiohydrolase, cellulase, chitinase, coumaric acid esterase, cyclodextrin glycosyltransferase, cutinase, cyclodextrin glycosyltransferase, deoxyribonuclease, endoglucanase, esterase, feruloyl esterase, lytic polysaccharide monooxygenase, alpha-galactosidase, beta-galactosidase, glucocerebrosidase, glucose oxidase, alpha-glucosidase, beta-glucosidase, glucuronidase, glucuronoyl esterase, haloperoxidase, hemicellulase, invertase, isomerase, laccase, ligase, lipase, lysozyme, mannanase, mannosidase, mutanase, oxidase, pectinolytic enzyme, peroxidase, phospholipase, phytase, phenoloxidase, polyphenoloxidase, proteolytic enzyme, ribonuclease, alpha-1,6-transglucosidase, transglutaminase, urokinase, xylanase, or beta-xylosidase.

In another embodiment, the polypeptide is an endoglucanase. In another embodiment, the polypeptide is a cellobiohydrolase. In another embodiment, the polypeptide is a beta-glucosidase. In another embodiment, the polypeptide is a lytic polysaccharide monooxygenase (AA9 or GH61 polypeptide). In another embodiment, the polypeptide is a xylanase. In another embodiment, the polypeptide is a beta-xylosidase. In another embodiment, the polypeptide is an acetyxylan esterase. In another embodiment, the polypeptide is a feruloyl esterase. In another embodiment, the polypeptide is an arabinofuranosidase. In another embodiment, the polypeptide is a glucuronidase. In another embodiment, the polypeptide is an acetylmannan esterase. In another embodiment, the polypeptide is an arabinanase. In another embodiment, the polypeptide is a coumaric acid esterase. In another embodiment, the polypeptide is a galactosidase. In another embodiment, the polypeptide is a glucuronoyl esterase. In another embodiment, the polypeptide is a mannanase. In another embodiment, the polypeptide is a mannosidase. In another embodiment, the polypeptide is a laccase. In another embodiment, the polypeptide is a catalase.

Nucleic Acid Constructs

The present invention also relates to nucleic acid constructs comprising a polynucleotide of the present invention, e.g., a polynucleotide encoding a secreted polypeptide of interest or a polynucleotide comprising a mutated ire1 gene encoding a variant Ire1 polypeptide, wherein the polynucleotide is preferably operably linked to one or more control sequences that direct the expression of the coding sequence in a suitable host cell under conditions compatible with the control sequences.

The polynucleotide may be manipulated in a variety of ways to provide for expression of the polypeptide. Manipulation of the polynucleotide prior to its insertion into a vector may be desirable or necessary depending on the expression vector. The techniques for modifying polynucleotides utilizing recombinant DNA methods are well known in the art.

The control sequence may be a promoter, a polynucleotide that is recognized by a host cell for expression of a polynucleotide encoding a polypeptide of the present invention. The promoter contains transcriptional control sequences that mediate the expression of the polypeptide. The promoter may be any polynucleotide that shows transcriptional activity in the host cell including mutant, truncated, and hybrid promoters, and may be obtained from genes encoding extracellular or intracellular polypeptides either homologous or heterologous to the host cell.

Examples of suitable promoters for directing transcription of the nucleic acid constructs of the present invention in a filamentous fungal host cell are promoters obtained from the genes for *Aspergillus nidulans* acetamidase, *Aspergillus niger* neutral alpha-amylase, *Aspergillus niger* acid stable alpha-amylase, *Aspergillus niger* or *Aspergillus awamori* glucoamylase (glaA), *Aspergillus oryzae* TAKA amylase, *Aspergillus oryzae* alkaline protease, *Aspergillus oryzae* triose phosphate isomerase, *Fusarium oxysporum* trypsin-like protease (WO 96/00787), *Fusarium venenatum* amyloglucosidase (WO 00/56900), *Fusarium venenatum* Daria (WO 00/56900), *Fusarium venenatum* Quinn (WO 00/56900), Rhizomucormiehei lipase, *Rhizomucor miehei* aspartic proteinase, *Trichoderma reesei* beta-glucosidase, *Trichoderma reesei* cellobiohydrolase I, *Trichoderma reesei* cellobiohydrolase II, *Trichoderma reeseiendoglucanase* I, *Trichoderma reesei* endoglucanase II, *Trichoderma reesei* endoglucanase I, *Trichoderma reesei* endoglucanase V, *Trichoderma reesei* xylanase I, *Trichoderma reesei* xylanase II, *Trichoderma reesei* xylanase III, *Trichoderma reesei* beta-xylosidase, and *Trichoderma reesei* translation elongation factor, as well as the NA2-tpi promoter (a modified promoter from an *Aspergillus* neutral alpha-amylase gene in which the untranslated leader has been replaced by an untranslated leader from an *Aspergillus* triose phosphate isomerase gene; non-limiting examples include modified promoters from an *Aspergillus niger* neutral alpha-amylase gene in which the untranslated leader has been replaced by an untranslated leader from an *Aspergillus nidulans* or *Aspergillus oryzae* triose phosphate isomerase gene); and mutant, truncated, and hybrid promoters thereof. Other promoters are described in U.S. Pat. No. 6,011,147.

The control sequence may also be a transcription terminator, which is recognized by a host cell to terminate transcription. The terminator is operably linked to the 3'-terminus of the polynucleotide encoding the polypeptide. Any terminator that is functional in the host cell may be used in the present invention.

Preferred terminators for filamentous fungal host cells are obtained from the genes for *Aspergillus nidulans* acetamidase, *Aspergillus nidulans* anthranilate synthase, *Aspergillus niger* glucoamylase, *Aspergillus niger* alpha-glucosidase, *Aspergillus oryzae* TAKA amylase, *Fusarium oxysporum* trypsin-like protease, *Trichoderma reesei* beta-glucosidase, *Trichoderma reesei* cellobiohydrolase I, *Trichoderma reesei* cellobiohydrolase II, *Trichoderma reesei* endoglucanase I, *Trichoderma reesei* endoglucanase II, *Trichoderma reesei* endoglucanase III, *Trichoderma reesei* endoglucanase V, *Trichoderma reesei* xylanase I, *Trichoderma reesei* xylanase II, *Trichoderma reesei* xylanase III, *Trichoderma reesei* beta-xylosidase, and *Trichoderma reesei* translation elongation factor.

The control sequence may also be a leader, a nontranslated region of an mRNA that is important for translation by the host cell. The leader is operably linked to the 5'-terminus of the polynucleotide encoding the polypeptide. Any leader that is functional in the host cell may be used.

Preferred leaders for filamentous fungal host cells are obtained from the genes for *Aspergillus oryzae* TAKA amylase and *Aspergillus nidulans* triose phosphate isomerase.

The control sequence may also be a polyadenylation sequence, a sequence operably linked to the 3'-terminus of the polynucleotide and, when transcribed, is recognized by the host cell as a signal to add polyadenosine residues to transcribed mRNA. Any polyadenylation sequence that is functional in the host cell may be used.

Preferred polyadenylation sequences for filamentous fungal host cells are obtained from the genes for *Aspergillus nidulans* anthranilate synthase, *Aspergillus niger* glucoamylase, *Aspergillus niger* alpha-glucosidase, *Aspergillus oryzae* TAKA amylase, and *Fusarium oxysporum* trypsin-like protease.

The control sequence may also be a signal peptide coding region that encodes a signal peptide linked to the N-terminus of a polypeptide and directs the polypeptide into the cell's secretory pathway. The 5'-end of the coding sequence of the polynucleotide may inherently contain a signal peptide coding sequence naturally linked in translation reading frame with the segment of the coding sequence that encodes the polypeptide. Alternatively, the 5'-end of the coding sequence may contain a signal peptide coding sequence that is heterologous to the coding sequence. A heterologous signal peptide coding sequence may be required where the coding sequence does not naturally contain a signal peptide coding sequence. Alternatively, a heterologous signal peptide coding sequence may simply replace the natural signal peptide coding sequence to enhance secretion of the polypeptide. However, any signal peptide coding sequence that directs the expressed polypeptide into the secretory pathway of a host cell may be used.

Effective signal peptide coding sequences for filamentous fungal host cells are the signal peptide coding sequences obtained from the genes for *Aspergillus niger* neutral amylase, *Aspergillus niger* glucoamylase, *Aspergillus oryzae* TAKA amylase, *Humicola insolens* cellulase, *Humicola insolens* endoglucanase V, *Humicola lanuginosa* lipase, and *Rhizomucor miehei* aspartic proteinase.

The control sequence may also be a propeptide coding sequence that encodes a propeptide positioned at the N-terminus of a polypeptide. The resultant polypeptide is known as a proenzyme or propolypeptide (or a zymogen in some cases). A propolypeptide is generally inactive and can be converted to an active polypeptide by catalytic or autocatalytic cleavage of the propeptide from the propolypeptide. The propeptide coding sequence may be obtained from the genes for *Myceliophthora thermophila* laccase (WO 95/33836), *Rhizomucor miehei* aspartic proteinase, and *Saccharomyces cerevisiae* alpha-factor.

Where both signal peptide and propeptide sequences are present, the propeptide sequence is positioned next to the N-terminus of a polypeptide and the signal peptide sequence is positioned next to the N-terminus of the propeptide sequence.

It may also be desirable to add regulatory sequences that regulate expression of a polypeptide relative to the growth of the host cell. Examples of regulatory sequences are those that cause expression of the gene to be turned on or off in response to a chemical or physical stimulus, including the presence of a regulatory compound. In filamentous fungi, the *Aspergillus niger* glucoamylase promoter, *Aspergillus oryzae* TAKA alpha-amylase promoter, and *Aspergillus oryzae* glucoamylase promoter, *Trichoderma reesei* cellobiohydrolase I promoter, and *Trichoderma reesei* cellobiohydrolase II promoter may be used. Other examples of regulatory sequences are those that allow for gene amplification. In eukaryotic systems, these regulatory sequences include the dihydrofolate reductase gene that is amplified in the presence of methotrexate, and the metallothionein genes that are amplified with heavy metals. In these cases, the polynucleotide encoding the polypeptide would be operably linked to the regulatory sequence.

Expression Vectors

The present invention also relates to recombinant expression vectors comprising a polynucleotide of the present invention, e.g., a polynucleotide encoding a secreted polypeptide of interest or a second polynucleotide comprising a mutated ire1 gene encoding a variant Ire1 polypeptide, a promoter, and transcriptional and translational stop signals. The various nucleotide and control sequences may be joined together to produce a recombinant expression vector that may include one or more convenient restriction sites to allow for insertion or substitution of the polynucleotide encoding the polypeptide at such sites. Alternatively, the polynucleotide may be expressed by inserting the polynucleotide or a nucleic acid construct comprising the polynucleotide into an appropriate vector for expression. In creating the expression vector, the coding sequence is located in the vector so that the coding sequence is operably linked with the appropriate control sequences for expression.

The recombinant expression vector may be any vector (e.g., a plasmid or virus) that can be conveniently subjected to recombinant DNA procedures and can bring about expression of the polynucleotide. The choice of the vector will typically depend on the compatibility of the vector with the host cell into which the vector is to be introduced. The vector may be a linear or closed circular plasmid.

The vector may be an autonomously replicating vector, i.e., a vector that exists as an extrachromosomal entity, the replication of which is independent of chromosomal replication, e.g., a plasmid, an extrachromosomal element, a minichromosome, or an artificial chromosome. The vector may contain any means for assuring self-replication. Alternatively, the vector may be one that, when introduced into the host cell, is integrated into the genome and replicated together with the chromosome(s) into which it has been integrated. Furthermore, a single vector or plasmid or two or more vectors or plasmids that together contain the total DNA to be introduced into the genome of the host cell, or a transposon, may be used.

The vector preferably contains one or more selectable markers that permit easy selection of transformed, transfected, transduced, or the like cells. A selectable marker is a gene the product of which provides for biocide or viral resistance, resistance to heavy metals, prototrophy to auxotrophs, and the like.

Selectable markers for use in a filamentous fungal host cell include, but are not limited to, adeA (phosphoribosylaminoimidazole-succinocarboxamide synthase), adeB (phosphoribosyl-aminoimidazole synthase), amdS (acetamidase), argB (ornithine carbamoyltransferase), bar (phosphinothricin acetyltransferase), fcyA (cytosine deaminase), hph (hygromycin phosphotransferase), niaD (nitrate reductase), pyrG (orotidine-5'-phosphate decarboxylase), sC (sulfate adenyltransferase), and trpC (anthranilate synthase), as well as equivalents thereof. Preferred for use in an *Aspergillus* cell are *Aspergillus nidulans* or *Aspergillus oryzae* amdS and pyrG genes and a *Streptomyces hygroscopicus* bar gene. Preferred for use in a *Trichoderma* cell are adeA, adeB, amdS, fcyA, hph, and pyrG genes.

The selectable marker may be a dual selectable marker system as described in WO 2010/039889. In one embodiment, the dual selectable marker is a hph-tk dual selectable marker system.

The vector preferably contains an element(s) that permits integration of the vector into the host cell's genome or autonomous replication of the vector in the cell independent of the genome.

For integration into the host cell genome, the vector may rely on the polynucleotide's sequence encoding the polypeptide or any other element of the vector for integration into the genome by homologous or non-homologous recombination. Alternatively, the vector may contain additional polynucleotides for directing integration by homologous recombination into the genome of the host cell at a precise location(s) in the chromosome(s). To increase the likelihood of integration at a precise location, the integrational elements should contain a sufficient number of nucleic acids, such as 100 to 10,000 base pairs, 400 to 10,000 base pairs, and 800 to 10,000 base pairs, which have a high degree of sequence identity to the corresponding target sequence to enhance the probability of homologous recombination. The integrational elements may be any sequence that is homologous with the target sequence in the genome of the host cell. Furthermore, the integrational elements may be non-encoding or encoding polynucleotides. On the other hand, the vector may be integrated into the genome of the host cell by non-homologous recombination.

For autonomous replication, the vector may further comprise an origin of replication enabling the vector to replicate autonomously in the host cell in question. The origin of replication may be any plasmid replicator mediating autonomous replication that functions in a cell. The term "origin of replication" or "plasmid replicator" means a polynucleotide that enables a plasmid or vector to replicate in vivo.

Examples of origins of replication useful in a filamentous fungal cell are AMA1 and ANS1 (Gems et al., 1991, *Gene* 98: 61-67; Cullen et al., 1987, *Nucleic Acids Res.* 15: 9163-9175; WO 00/24883). Isolation of the AMA1 gene and construction of plasmids or vectors comprising the gene can be accomplished according to the methods disclosed in WO 00/24883.

More than one copy of a polynucleotide of the present invention may be inserted into a host cell to increase production of a polypeptide. An increase in the copy number of the polynucleotide can be obtained by integrating at least one additional copy of the sequence into the host cell genome or by including an amplifiable selectable marker gene with the polynucleotide where cells containing amplified copies of the selectable marker gene, and thereby additional copies of the polynucleotide, can be selected for by cultivating the cells in the presence of the appropriate selectable agent.

The procedures used to ligate the elements described above to construct the recombinant expression vectors of the present invention are well known to one skilled in the art (see, e.g., Sambrook et al., 1989, supra).

Filamentous Fungal Host Cells

In another aspect, the present invention relates to a recombinant filamentous fungal host cell, comprising and expressing a first polynucleotide encoding a heterologous polypeptide of interest and a second polynucleotide comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

In some embodiments, the recombinant host cell comprises at least two copies, e.g., three, four, or five, of a polynucleotide of the present invention.

The host cell may be any filamentous fungal cell. "Filamentous fungi" include all filamentous forms of the subdivision Eumycota and Oomycota (as defined by Hawksworth et al., 1995, supra). The filamentous fungi are generally characterized by a mycelial wall composed of chitin, cellulose, glucan, chitosan, mannan, and other complex polysaccharides. Vegetative growth is by hyphal elongation and carbon catabolism is obligately aerobic.

The filamentous fungal host cell may be an *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes,* or *Trichoderma* cell.

For example, the filamentous fungal host cell may be an *Aspergillus awamori, Aspergillus foetidus, Aspergillus fumigatus, Aspergillus japonicus, Aspergillus nidulans, Aspergillus niger, Aspergillus oryzae, Bjerkandera adusta, Ceriporiopsis aneirina, Ceriporiopsis caregiea, Ceriporiopsis gilvescens, Ceriporiopsis pannocinta, Ceriporiopsis rivulosa, Ceriporiopsis subrufa, Ceriporiopsis subvermispora, Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonatum, Coprinus cinereus, Coriolus hirsutus, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium* venenatum, Humicola insolens, Humicola lanuginosa, Mucor miehei, Myceliophthora thermophila, Neurospora crassa, Penicillium purpurogenum, Phanerochaete chrysosporium, Phlebia radiata, Pleurotus eryngii, Talaromyces emersonii, Thielavia terrestris, Trametes villosa, Trametes versicolor, Trichoderma harzianum, Trichoderma koningii, Trichoderma longibrachiatum, Trichoderma reesei, or Trichoderma viride cell.

In a preferred embodiment, the filamentous fungal host cell is a Trichoderma cell.

In a more preferred embodiment, the Trichoderma cell is a Trichoderma harzianum, Trichoderma koningii, Trichoderma longibrachiatum, Trichoderma reesei, or Trichoderma viride cell.

In a most preferred embodiment, the Trichoderma cell is a Trichoderma harzianum cell. In a most preferred embodiment, the Trichoderma cell is a Trichoderma koningii cell. In a most preferred embodiment, the Trichoderma cell is a Trichoderma longibrachiatum cell. In a most preferred embodiment, the Trichoderma cell is a Trichoderma reesei cell. In a most preferred embodiment, the Trichoderma cell is a Trichoderma viride cell.

Fungal cells may be transformed by a process involving protoplast formation, transformation of the protoplasts, and regeneration of the cell wall in a manner known per se. Suitable procedures for transformation of Aspergillus and Trichoderma host cells are described in EP 238023, Yelton et al., 1984, Proc. Natl. Acad. Sci. USA 81: 1470-1474, and Christensen et al., 1988, Bio/Technology 6: 1419-1422. Suitable methods for transforming Fusarium species are described by Malardier et al., 1989, Gene 78: 147-156, and WO 96/00787.

Methods of Production

The present invention also relates to a method of producing a secreted heterologous polypeptide of interest, said method comprising the steps of:
 (a) cultivating a filamentous fungal host cell of the present invention under conditions suitable for the production and secretion of the heterologous polypeptide; and, optionally
 (b) recovering the secreted heterologous polypeptide of interest.

The host cells are cultivated in a nutrient medium suitable for production of the polypeptide using methods known in the art. For example, the cells may be cultivated by shake flask cultivation, or small-scale or large-scale fermentation (including continuous, batch, fed-batch, or solid-state fermentations) in laboratory or industrial fermentors in a suitable medium and under conditions allowing the polypeptide to be expressed and/or isolated. The cultivation takes place in a suitable nutrient medium comprising carbon and nitrogen sources and inorganic salts, using procedures known in the art. Suitable media are available from commercial suppliers or may be prepared according to published compositions (e.g., in catalogues of the American Type Culture Collection).

The polypeptide may be detected using methods known in the art that are specific for the polypeptides. These detection methods include, but are not limited to, use of specific antibodies, formation of an enzyme product, or disappearance of an enzyme substrate. For example, an enzyme assay may be used to determine the activity of the polypeptide The polypeptide may be recovered using methods known in the art. For example, the polypeptide may be recovered from the fermentation medium by conventional procedures including, but not limited to, collection, centrifugation, filtration, extraction, spray-drying, evaporation, or precipitation. In one embodiment, a whole fermentation broth comprising the polypeptide is recovered.

The polypeptide may be purified by a variety of procedures known in the art including, but not limited to, chromatography (e.g., ion exchange, affinity, hydrophobic, chromatofocusing, and size exclusion), electrophoretic procedures (e.g., preparative isoelectric focusing), differential solubility (e.g., ammonium sulfate precipitation), SDS-PAGE, or extraction (see, e.g., Protein Purification, Janson and Ryden, editors, VCH Publishers, New York, 1989) to obtain substantially pure polypeptides.

The present invention is further described by the following examples that should not be construed as limiting the scope of the invention.

EXAMPLES

Strains

Trichoderma reesei BTR213 is described in WO 2013/086633.

Trichoderma reesei strain FRT4New-8G4A is a ku70 disrupted and paracelsin synthetase (parS) gene deleted strain of T. reesei BTR213 and has FRT sites (FRT-F and FRT-F3) inserted at each of four loci for site-specific targeted integration of an expression cassette using the Saccharomyces cerevisiae flippase (FLP) and flippase recognition sequences FRT-F and FRT-F3 as described in WO 2012/160093 and US 2018/0037897. The Aspergillus niger cytosine deaminase (fcyA) gene was inserted between the FRT-F and FRT-F3 sites at each of the four loci to use as counterselection on 5-fluorocytosine (5FC).

Media and Solutions

CIM medium was composed of 20 g of cellulose, 10 g of corn steep solids, 1.45 g of $(NH_4)_2SO_4$, 2.08 g of $KH_2PO_4$, 0.28 g of $CaCl_2$, 0.42 g of $MgSO_4.7H_2O$, 0.42 ml of Trichoderma trace metals solution, 1-2 drops of antifoam, and deionized water to 1 liter, pH adjusted to 6.0. Trichoderma trace metals solution was composed of 216 g of $FeCl_3.6H_2O$, 58 g of $ZnSO_4.7H_2O$, 27 g of $MnSO_4.H_2O$, 10 g of $CuSO_4.5H_2O$, 2.4 g of $H_3BO_3$, 336 g of citric acid, and deionized water to 1 liter.

COVE plates were composed of 342.30 g of sucrose, 25 g of Noble agar, 20 ml of COVE salts solution, 10 mM acetamide, 15 mM cesium chloride, and deionized water to 1 liter.

COVE2 plates were composed of 30 g of sucrose, 20 ml of COVE salts solution, 10 ml of 1 M acetamide, 25 g of Noble agar, and deionized water to 1 liter.

COVE salts solution was composed of 26 g of KCl, 26 g of $MgSO_4.7H_2O$, 76 g of $KH_2PO_4$, 50 ml of COVE trace metals solution, and deionized water to 1 liter.

COVE trace metals solution was composed of 0.04 g of $Na_2B_4O_7.10H_2O$, 0.4 g of $CuSO_4.5H_2O$, 1.2 g of $FeSO_4.7H_2O$, 0.7 g of $MnSO_4.H_2O$, 0.8 g of $Na_2MoO_2.2H_2O$, 10 g of $ZnSO_4.7H_2O$, and deionized water to 1 liter.

Fermentation batch medium was composed of 24 g of dextrose, 40 g of soy meal, 8 g of $(NH_4)_2SO_4$, 3 g of $K_2HPO_4$, 8 g of $K_2SO_4$, 3 g of $CaCO_3$, 8 g of $MgSO_4.7H_2O$, 1 g of citric acid, 8.8 ml of 85% phosphoric acid, 1 ml of anti-foam, 14.7 ml of trace metals solution, and deionized water to 1 liter. Trace metals solution was composed of 26.1 g of FeSO$_4$.7H$_2$O, 5.5 g of ZnSO$_4$.7H$_2$O, 6.6 g of MnSO$_4$.H$_2$O, 2.6 g of CuSO$_4$.5H$_2$O, 2 g of citric acid, and deionized water to 1 liter.

LB+Amp medium was composed of 10 g of tryptone, 5 g of yeast extract, 5 g of sodium chloride, 50 mg of ampicillin (filter sterilized, added after autoclaving), and deionized water to 1 liter.

PDA plates were composed of 39 g of potato dextrose agar (Difco) and deionized water to 1 liter. The solution was sterilized by autoclaving.

PEG buffer was composed of 50% polyethylene glycol (PEG) 4000, 10 mM Tris-HCl pH 7.5, and 10 mM CaCl$_2$ in deionized water.

Shake Flask medium was composed of 20 g of glycerol, 10 g of soy meal, 1.5 g of (NH$_4$)$_2$SO$_4$, 2 g of KH$_2$PO$_4$, 0.2 g of CaCl$_2$, 0.4 g of MgSO$_4$.7H$_2$O, 0.2 ml of trace metals solution, and deionized water to 1 liter. Trace metals solution was composed of 26.1 g of FeSO$_4$.7H$_2$O, 5.5 g of ZnSO$_4$.7H$_2$O, 6.6 g of MnSO$_4$.H$_2$O, 2.6 g of CuSO$_4$.5H$_2$O, 2 g of citric acid, and deionized water to 1 liter.

SOC medium was composed of 20 g of tryptone, 5 g of yeast extract, 0.5 g of NaCl, 10 ml of 250 mM KCl, and deionized water to 1 liter.

STC was composed of 1 M sorbitol, 10 mM Tris pH 7.5, and 10 mM CaCl$_2$ in deionized water.

TAE buffer was composed of 4.84 g of Tris base, 1.14 ml of glacial acetic acid, 2 ml of 0.5 M EDTA pH 8.0, and deionized water to 1 liter.

TBE buffer was composed of 10.8 g of Tris Base, 5 g of boric acid, 4 ml of 0.5 M EDTA pH 8, and deionized water to 1 liter.

Trichoderma Minimal Media (TrMM) plates were composed 30 g of sucrose, 20 ml of COVE salts solution, 0.6 g of CaCl$_2$.2H$_2$O, 6 g of (NH$_4$)$_2$SO$_4$, 25 g of Noble agar, and deionized water to 1 liter.

2XYT+Amp plates were composed of 16 g of tryptone, 10 g of yeast extract, 5 g of NaCl, 15 g of Bacto agar, 1 ml of ampicillin at 100 mg/ml, and deionized water to 1 liter.

YP medium was composed of 1% yeast extract and 2% peptone in deionized water.

Example 1: Genomic DNA Extraction from *Trichoderma reesei*

*Trichoderma reesei* was grown in 50 ml of YP medium supplemented with 2% glucose (w/v) in a 250 ml baffled shake flask at 28° C. for 2 days with agitation at 200 rpm. Mycelia from the cultivation were collected using a MIRACLOTH® (EMD Chemicals Inc.) lined funnel, squeeze-dried, and then transferred to a pre-chilled mortar and pestle. Each mycelia preparation was ground into a fine powder and kept frozen with liquid nitrogen. A total of 1-2 g of powder was transferred to a 50 ml tube and genomic DNA was extracted from the ground mycelial powder using a DNEASY® Plant Maxi Kit (QIAGEN Inc.). Five ml of AP1 Buffer (QIAGEN Inc.) pre-heated to 65° C. were added to the 50 ml tube followed by 10 µl of RNase A 100 mg/ml stock solution (QIAGEN Inc.), and incubated for 2-3 hours at 65° C. A total of 1.8 ml of AP2 Buffer (QIAGEN Inc.) was added and centrifuged at 3000-5000×g for 5 minutes. The supernatant was decanted into a QIAshredder Maxi Spin Column (QIAGEN Inc.) placed in a 50 ml collection tube, and centrifuged at 3000-5000×g for 5 minutes at room temperature (15-25° C.) in a swing-out rotor. The flow-through in the collection tube was transferred, without disturbing the pellet, into a new 50 ml tube. A 1.5 ml volume of AP3/E Buffer (QIAGEN Inc.) was added to the cleared lysate, and mixed immediately by vortexing. The sample (maximum 15 ml), including any precipitate that may have formed, was pipetted into a DNEASY® Maxi Spin Column (QIAGEN Inc.) placed in a 50 ml collection tube and centrifuged at 3000-5000×g for 5 minutes at room temperature (15-20° C.) in a swing-out rotor. The flow-through was discarded. Twelve ml of AW Buffer (QIAGEN Inc.) were added to the DNEASY® Maxi Spin Column, and centrifuged for 10 minutes at 3000-5000×g to dry the membrane. The flow-through and collection tube were discarded. The DNEASY® Maxi Spin Column was transferred to a new 50 ml tube. One-half ml of AE Buffer (QIAGEN Inc.), pre-heated to 65° C., was pipetted directly onto the DNEASY® Maxi Spin Column membrane, incubated for 5 minutes at room temperature (15-25° C.), and then centrifuged for 5 minutes at 3000-5000×g to elute the genomic DNA. The concentration and purity of the genomic DNA was determined by measuring the absorbance at 260 nm and 280 nm.

Example 2: *Trichoderma reesei* Protoplast Generation and Transformation

Protoplast preparation and transformation of *Trichoderma reesei* were performed using a protocol similar to Penttila et al., 1987, *Gene* 61: 155-164. Briefly, *T. reesei* was cultivated in 25 ml of YP medium supplemented with 2% (w/v) glucose and 10 mM uridine at 27° C. for 17 hours with gentle agitation at 90 rpm. Mycelia were collected by filtration using a Vacuum Driven Disposable Filtration System (Millipore) and washed twice with deionized water and twice with 1.2 M sorbitol. Protoplasts were generated by suspending the washed mycelia in 100 ml of 1.2 M sorbitol containing 5 mg/ml of YATALASE™ Enzyme (Takara Bio USA, Inc.) and 0.36 units of chitinase (Sigma Chemical Co.) per ml for 60-75 minutes at 34° C. with gentle shaking at 90 rpm. Protoplasts were collected by centrifugation at 834×g for 7 minutes and washed twice with cold 1.2 M sorbitol. The protoplasts were counted using a hemocytometer and re-suspended to a final concentration of 1×10$^8$ protoplasts per ml of STC.

Approximately 1-10 µg of DNA were added to 100 µl of the protoplast solution and mixed gently. PEG buffer (250 µl) was added, and the reaction was mixed and incubated at 34° C. for 30 minutes. STC (3 ml) was then added, and the reaction was mixed and then spread onto COVE plates for amdS selection. The plates were incubated at 30° C. for 6-11 days.

Example 3: Construction of Plasmid pJfyS207

Plasmid pJfyS207 contains the *Aspergillus nidulans* acetamidase (amdS) gene as a selection marker and the human Herpes simplex virus type 1 thymidine kinase gene (HSV-1 tk) gene flanked by 234 bp *Fusarium venenatum* pyrG repeats to facilitate marker excision.

A PCR fragment containing the *Aspergillus nidulans* acetamidase (amdS) gene was generated using the following primers:

```
Forward Primer 1213884:
                                        (SEQ ID NO: 4)
AAAGACAAGGCCTAGTTGGAGTATTTGGAAACGCAACCCTGAAGG Reverse Primer 1213885:
                                        (SEQ ID NO: 5)
AGTAGTCGGCCAAGGGCGAATTCTCTACGCCAGGACCGAGCAA
```

The PCR was composed of 10 ng of pMJ09 (WO 2005/056772), 10 mM dNTPs, 50 pmol of forward primer 1213884, 50 pmol of reverse primer 1213885, 1×PHUSION® HF buffer (Thermo Fisher Scientific, Inc.), and 2.5 units of PHUSION® Hot Start DNA polymerase (Thermo Fisher Scientific, Inc.) in a final volume of 50 µl. The reaction was incubated in a thermocycler programmed for 1 cycle at 98° C. for 2 minutes; 30 cycles each at 95° C. for 20 seconds, 57° C. for 20 seconds, and 72° C. for 2 minutes; 1 cycle at 72° C. for 2 minutes; and a 10° C. hold. The resulting 2766 bp PCR fragment was purified by 0.9% agarose gel electrophoresis using TBE buffer, excised from the gel, and extracted using a NUCLEOSPIN® Gel and PCR Clean-up Kit (Macherey Nagel).

A PCR fragment containing 234 bp of the *Fusarium venenatum* pyrG gene was generated using the following primers:

```
Forward Primer 1213882:
                                         (SEQ ID NO: 6)
GGCCTTTTGCTCACATGGTTTAAACGGCGCGCCCGACAAAACAAGGCTA

CTGCAGGCA

Reverse Primer 1213883:
                                         (SEQ ID NO: 7)
AATACTCCAACTAGGCCTTGTCTTT
```

The PCR was composed of 10 ng of pJfyS1579-41-11 (WO 2011/075677), 10 mM dNTPs, 50 pmol of forward primer 1213882, 50 pmol of reverse primer 1213883, 1×PHUSION® HF buffer, and 2.5 units of PHUSION® Hot Start DNA polymerase in a final volume of 50 µl. The reaction was incubated in a thermocycler programmed for 1 cycle at 98° C. for 2 minutes; 30 cycles each at 95° C. for 20 seconds, 57° C. for 20 seconds, and 72° C. for 40 seconds; 1 cycle at 72° C. for 2 minutes; and a 10° C. hold. The resulting 250 bp PCR fragment was purified by 0.9% agarose gel electrophoresis using TBE buffer, excised from the gel, and extracted using a NUCLEOSPIN® Gel and PCR Clean-up Kit.

A single DNA fragment was generated from the above individual PCR products by splicing by overlap extension (SOE) PCR using PHUSION® Hot Start DNA polymerase and the DNA fragment-specific forward and reverse primers shown below.

```
Forward Primer 1213882:
                                         (SEQ ID NO: 8)
GGCCTTTTGCTCACATGGTTTAAACGGCGCGCCCGACAAAACAAGGCTA

CTGCAGGCA

Reverse primer 1213885:
                                         (SEQ ID NO: 9)
AGTAGTCGGCCAAGGGCGAATTCTCTACGCCAGGACCGAGCAA
```

The SOE PCR was composed of 1 µl of each gel-purified PCR product above, 10 mM dNTPs, 10 pmol of forward primer 1213882, 10 pmol of reverse primer 1213885, 1×PHUSION® HF buffer, and 2.5 units of PHUSION® Hot Start DNA polymerase in a final volume of 50 µl. The reaction was incubated in a thermocycler programmed for 1 cycle at 98° C. for 2 minutes; 35 cycles each at 95° C. for 20 seconds, 57° C. for 20 seconds, and 72° C. for 2 minutes; 1 cycle at 72° C. for 2 minutes; and a 10° C. hold. The resulting 2991 bp PCR fragment was purified by 1% agarose gel electrophoresis using TBE buffer, excised from the gel, and extracted using a NUCLEOSPIN® Gel and PCR Clean-up Kit.

The 2991 bp DNA fragment was inserted into Eco RI and Asc I digested pJfyS1579-41-11 (WO 2011/075677) using an IN-FUSION® HD Cloning Kit (Clontech Laboratories Inc.). The reaction was composed of Eco RI and Asc I digested pJfyS1579-41-11, 75 ng of the 2991 bp SOE PCR fragment, and 1× IN-FUSION® HD Enzyme Premix in a 10 µl reaction volume. After incubating the mixture for 15 minutes at 50° C., 2 µl of the reaction were transformed into 50 µl of STELLAR™ chemically competent *E. coli* cells (Clontech Laboratories). The cells were heat shocked at 42° C. for 45 seconds after which 100 µl of SOC medium were added and the total volume was spread onto a 150 mm 2XYT+Amp plate and incubated at 37° C. overnight. The resulting *E. coli* transformants were individually inoculated into 3 ml of LB+Amp medium in 14 ml round-bottom polypropylene tubes and incubated at 37° C. overnight with shaking at 200 rpm. Plasmid DNA was isolated using a BIOROBOT® 9600 (QIAGEN Inc.). The insert was confirmed by DNA sequencing with a Model 377 XL Automated DNA Sequencer (Applied Biosystems Inc.) using dye-terminator chemistry (Giesecke et al., 1992, *J. Virol. Methods* 38: 47-60). One transformant was identified as containing the insert with no PCR errors and the plasmid was designated pJfyS207 (FIG. 1).

Example 4: Construction of pSaMF128 for Integration of an Ala153Thr Mutation in the *Trichoderma reesei* Ire1 Gene Plasmid pSaMF128 was constructed for integration of a single nucleotide mutation into the *Trichoderma reesei* FRT4New-8G4A strain native ire1 gene (SEQ ID NO: 1 for the genomic DNA sequence, SEQ ID NO: 2 for the deduced amino acid sequence, and SEQ ID NO: 3 for the cDNA sequence) to cause the amino acid change Ala153Thr. Plasmid pSaMF128 contains the *T. reesei* ire1 promoter region (5' flanking), the *T. reesei* ire1 mutant gene (Ala153Thr), and a 200 bp *T. reesei* ire1 terminator region (3' flanking repeat) followed by the *Aspergillus nidulans* acetamidase (amdS) gene and the human Herpes simplex virus type 1 thymidine kinase gene (HSV-1 tk) gene. The amdS and HSV-1 tk genes lie between the 3' flanking repeat region (above) of the ire1 gene and a 1500 bp 3' flanking region of the ire1 gene. Plasmid pSaMF128 was constructed as described below.

Initially, plasmid pSaMF123 was constructed as a derivative of plasmid pJfyS207 (Example 3) where the amdS gene and the HSV-1 tk gene lie between 234 bp *Fusarium venenatum* pyrG repeats.

A PCR product (DNA fragment 1) containing the 5' flanking region of the *T. reesei* ire1 gene and a portion of the ire1 gene introducing the Ala153Thr mutation and containing the 3' flanking region of the *T. reesei* ire1 gene was generated using the following primers:

```
DNA fragment 1:
Forward primer:
                                        (SEQ ID NO: 10)
CACATGGTTTAAACGGCGCGCCCGTCTGGTCCTCTCTTTTGT Reverse primer:
                                        (SEQ ID NO: 11)
TGTGGTGTTCGGACGGTCTGAGCCGGAGCTAAAGTTGCGA
```

DNA fragment 1 was amplified by PCR in a reaction composed of approximately 75 ng of *T. reesei* BTR21 genomic DNA, 10 µl of 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2.5 minutes; 1 cycle at 72° C. for 10 minutes; and a 10° C. hold. The resulting 3,570 bp PCR fragment was purified by 0.8% agarose gel electrophoresis using TBE buffer, excised from the gel, and extracted using a NUCLEOSPIN® Gel and PCR Clean-up Kit.

A PCR product (fragment 2) containing a portion of the *T. reesei* ire1 gene introducing the Ala153Thr mutation and 200 bp of the 3' flanking region of the ire1 gene was generated using the following primers:

```
DNA fragment 2:
Forward primer:
                                        (SEQ ID NO: 12)
CAGACCGTCCGAACACCACACACCTCACGACATCACTGGC Reverse primer:
                                        (SEQ ID NO: 13)
CCCTTCAGGGTTGCGTTTCCACAACAGAAGCTGAAACAATT
```

DNA fragment 2 was amplified by PCR in a reaction composed of approximately 75 ng of *T. reesei* BTR213 genomic DNA, 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2.5 minutes; 1 cycle at 72° C. for 10 minutes; and a 10° C. hold. The resulting 3,570 bp PCR fragment was purified by 0.8% agarose gel electrophoresis using TBE buffer, excised from the gel, and extracted using a NUCLEOSPIN® Gel and PCR Clean-up Kit.

A PCR product (fragment 3) containing the 3' flanking region of the *T. reesei* ire1 gene was generated using the following primers:

```
DNA fragment 3:
Forward primer:
                                        (SEQ ID NO: 14)
CTTCCTTGAACTCTCAGATCTCCCGGGAAGAAAGAAAAGGAAGAGAA Reverse primer:
                                        (SEQ ID NO: 15)
CCATATTTAAATCCTGCAGGCTCGACATATCGCCAGGGAG
```

DNA fragment 3 was amplified by PCR in a reaction composed of approximately 75 ng of *T. reesei* BTR213 genomic DNA, 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 60° C. for 30 seconds, and 72° C. for 1 minute; 1 cycle at 72° C. for 10 minutes; and a 10° C. hold. for 30 seconds, and 72° C. for 3 minutes; 1 cycle at 72° C. for 10 minutes; and a 10° C. hold. The resulting 1,547 bp PCR fragment was purified by 0.8% agarose gel electrophoresis using TBE buffer, excised from the gel, and extracted using a NUCLEOSPIN® Gel and PCR Clean-up Kit.

A PCR product (DNA fragment 4) containing the amdS gene and the HSV-1 tk gene was generated from plasmid pJfyS207 using the following primers:

```
DNA fragment 4:
Forward primer:
                                        (SEQ ID NO: 16)
AATTGTTTCAGCTTCTGTTGTGGAAACGCAACCCTGAAGG Reverse primer:
                                        (SEQ ID NO: 17)
TCTTTCTTCCCGGGAGATCTGAGAGTTCAAGGAAGAAACA
```

DNA fragment 4 was amplified by PCR in a reaction composed of approximately 75 ng of plasmid pJfyS207 DNA, 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2.5 minutes; 1 cycle at 72° C. for 10 minutes; and a 10° C. hold. The resulting 3,201 bp PCR fragment was purified by 0.8% agarose gel electrophoresis using TBE buffer, excised from the gel, and extracted using a NUCLEOSPIN® Gel and PCR Clean-up Kit.

A PCR product (DNA fragment 5) containing an *E. coli* origin of replication and ampicillin resistance marker was generated from pJfyS207 using the following primers:

```
DNA fragment 5:
Forward primer:
                                        (SEQ ID NO: 18)
CTCCCTGGCGATATGTCGAGCCTGCAGGATTTAAATATGGC Reverse primer:
                                        (SEQ ID NO: 19)
CAAAAGAGAGGACCAGACGGGCGCGCCGTTTAAACCATGTGAGCA
```

DNA fragment 5 was amplified by PCR in a reaction composed of approximately 75 ng of plasmid pJfyS207 DNA, 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2.5 minutes; 1 cycle at 72° C. for 10 minutes; and a 10° C. hold. The resulting 3,201 bp PCR fragment was purified by 0.8% agarose gel electrophoresis using TBE buffer, excised from the gel, and extracted using a NUCLEOSPIN® Gel and PCR Clean-up Kit.

Figure 2:
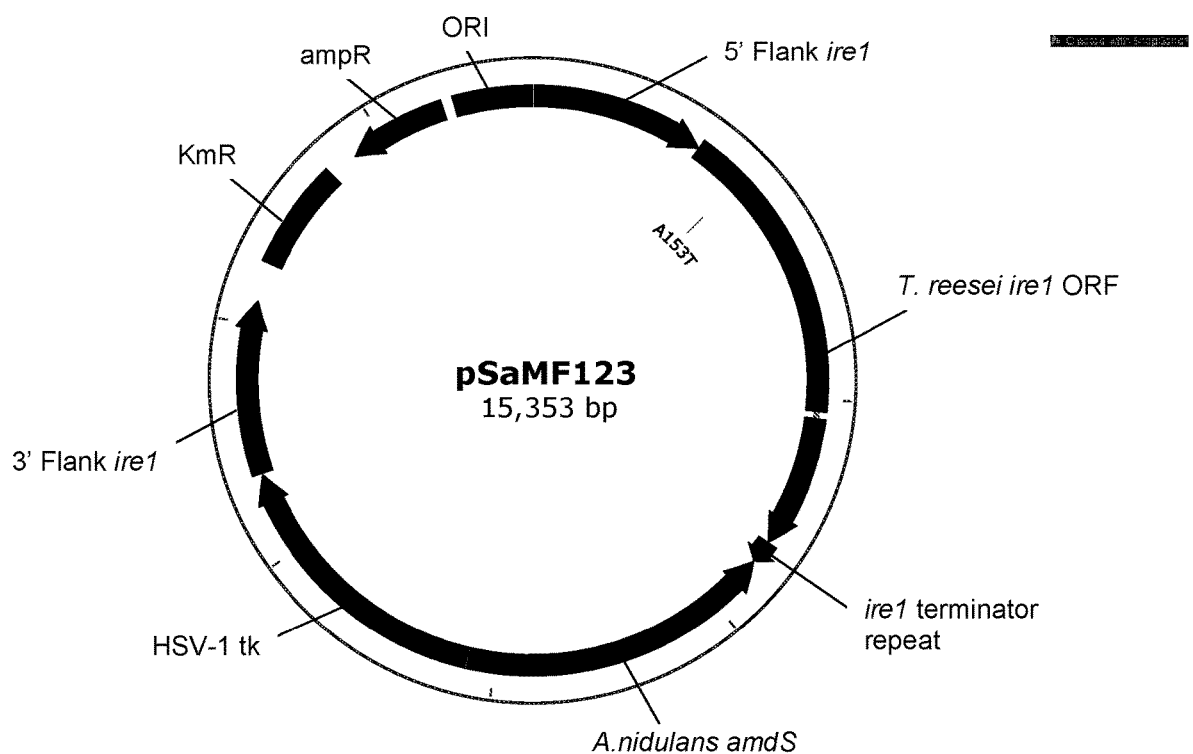
FIG. 2 shows a map of plasmid pSaMF123.

DNA fragments 1-5 were ligated together using a NEBUILDER® HiFi DNA Assembly Cloning Kit (New England Biolabs) according to the manufacturer's instructions. The reaction was performed at 50° C. for 60 minutes, frozen at −20° C., and then incubated at room temperature for 48 hours. One µl of the reaction mixture was transformed into STELLAR™ chemically competent *E. coli* cells. Transformants were spread onto 2XYT+Amp plates and incubated at 37° C. overnight. Plasmid DNA was purified from several transformants using a QIAPREP® Spin Miniprep Kit (QIAGEN Inc.). The plasmid DNA was screened for proper ligation by restriction enzyme digestion with Xba I, Nru I and Xho I followed by 0.8% agarose gel electrophoresis using TBE buffer. One plasmid was identified and designated pSaMF123 (FIG. 2).

DNA fragments 1 and 2 were each amplified from plasmid pSaMF123 as described below by PCR in a reaction composed of approximately 115 ng of plasmid pSaMF123 DNA, 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2 minutes; 1 cycle at 72° C. for 10 minutes; and a 10° C. hold.

DNA fragment 1: A PCR product containing a partial 5' flanking region of the *T. reesei* ire1 gene and a portion of the ire1 gene introducing the Ala153Thr mutation was generated using the following primers:

```
Forward primer:
                                        (SEQ ID NO: 20)
AAGCGGTTTCCGTTGCCTTCGAATTCGACAGAGCTGCGA Reverse primer:
                                        (SEQ ID NO: 21)
TGTGGTGTTCGGACGGGCTGAGCCGGAGCTAAAGTTGCGA
```

DNA fragment 1 was amplified by PCR in a reaction composed of approximately 115 ng of plasmid pSaMF123 DNA, 10 µl of 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2 minutes; 1 cycle at 72° C. for 10 minutes; and a 10° C. hold. The resulting 792 bp PCR fragment was purified by 0.8% agarose gel electrophoresis using TBE buffer, excised from the gel, and extracted using a NUCLEOSPIN® Gel and PCR Clean-up Kit DNA fragment 2: A PCR product containing a portion of the *T. reesei* ire1 gene introducing the Ala153Thr mutation extended to a Bst BI site was generated using the following primers:

```
Forward primer:
                                        (SEQ ID NO: 22)
CAGCCCGTCCGAACACCACACACCTCACGACATCACTGGC Reverse primer:
                                        (SEQ ID NO: 23)
AGATTGTAGTTGCCCTTTCGAATGTTCACCTCCCGCATAT
```

Figure 3:
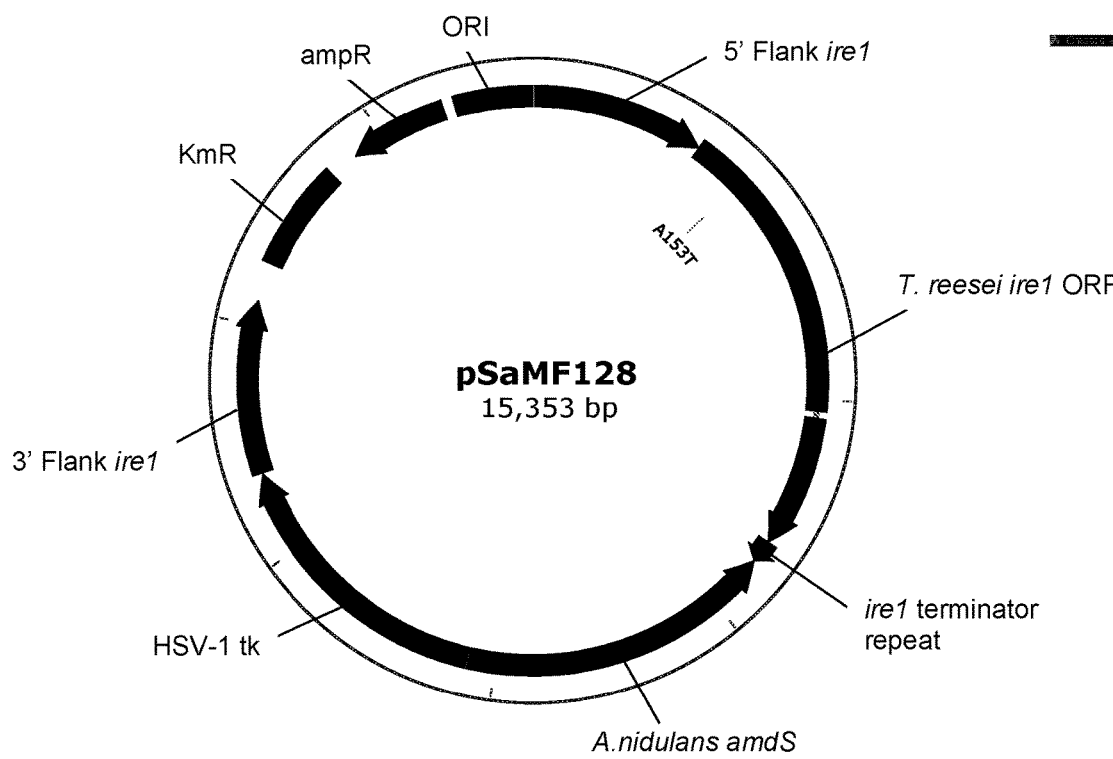
FIG. 3 shows a map of plasmid pSaMF128.

DNA fragment 2 was amplified by PCR in a reaction composed of approximately 115 ng of plasmid pSaMF123 DNA, 10 µl of 10 mM dNTPs, 50 pmol of forward primer, 50 pmol of reverse primer, 1×PHUSION® HF buffer, and 2 units of PHUSION® Hot Start DNA polymerase in a final volume of 50 µl. The reaction was incubated in a thermocycler programmed for 1 cycle at 98° C. for 2 minutes; 35 cycles each at 98° C. for 10 seconds, 65° C. for 30 seconds, and 72° C. for 2 minutes; 1 cycle at 72° C. for 10 minutes; and a 10° C. hold. The resulting 2,811 bp PCR fragment was purified by 0.8% agarose gel electrophoresis using TBE buffer, excised from the gel, and extracted using a NUCLEOSPIN® Gel and PCR Clean-up Kit Plasmid pSaMF123 was digested with Bst BI and purified by 0.8% agarose gel electrophoresis using TAE buffer, where a 11,809 bp fragment was excised from the gel and extracted using a NUCLEOSPIN® Gel and PCR Clean-up Kit. The 11,809 bp fragment was ligated to the 792 bp and 2,811 bp PCR fragments using an IN-FUSION™ HD Cloning Kit according to the manufacturer's instructions. The reaction was performed at 50° C. for 15 minutes. One µl of the reaction mixture were transformed into STELLAR™ chemically competent *E. coli* cells. Transformants were spread onto 2XYT+Amp plates and incubated at 37° C. overnight. Plasmid DNA was purified from several transformants using a QIAPREP® Spin Miniprep Kit. The plasmid DNA from several clones were sequenced by next-generation sequencing using a NEXTSEQ™ 500 System with a 2×150 bp output mode (Illumina Inc.). One plasmid was identified and designated pSaMF128 (FIG. 3).

Example 5: Transformation of *Trichoderma reesei* Strain FRT4New-8G4A with pSaMF128 for Integration of Ala153Thr Mutation in the Endogenous Ire1 Gene

*Trichoderma reesei* FRT4New-8G4A protoplasts were generated and transformed with 4.75 µg of Pme I and Swa I-linearized pSaMF128 (Example 4) according to Example 2. Nineteen transformants were obtained and each one was picked and transferred to 25 mm COVE2 plates and incubated for 5 days at 30° C.

A fungal spore PCR method using a PHIRE™ Plant Direct PCR Kit (Thermo Scientific) was used to screen the transformants for site-specific integration of the Pme I and Swa I-linearized pSaMF128 using the forward and reverse primers shown below for either 5' recombination or 3' recombination.

```
5' Recombination:
Forward primer 1221836:
                                        (SEQ ID NO: 24)
TGTCGAGGATGTGCTGGAGG Reverse primer 1221835:
                                        (SEQ ID NO: 25)
ACCTGCCGTAGAACCGAAGA 3' Recombination:
Forward primer 1220100:
                                        (SEQ ID NO: 26)
CTTATCAGCGGCCAGTTCTTCCC Reverse primer 1221837:
                                        (SEQ ID NO: 27)
GACTCGCATAAGATGGCGAC
```

The spore PCR was accomplished by collecting spores with a sterile 1 µl inoculation loop and transferring them to 20 µl of Dilution buffer (PHIRE™ Plant Direct PCR Kit) in a 0.6 ml tube. The spore suspension was used as template in a PCR to screen for integration of pSaMF128 at ire1 locus. The reaction was composed of 1.5 µl of the spore suspension, 12.5 pmol of each primer, 10 µl of 2×PHIRE™ Plant PCR Buffer (PHIRE™ Plant Direct PCR Kit), and 0.4 µl of PHIRE™ Hot Start II DNA Polymerase (PHIRE™ Plant Direct PCR Kit) in a 20 µl reaction.

The reaction was incubated in a thermocycler programmed for 1 cycle at 98° C. for 5 minutes; 40 cycles each at 98° C. for 10 seconds, 66° C. for 10 seconds, and 72° C. for 2 minutes; 1 cycle at 72° C. for 10 minutes; and a 4° C. hold. The completed PCRs were analyzed by 1% agarose gel electrophoresis using TAE buffer.

A successful targeted integration at the 5' end of the *T. reesei* ire1 gene locus produces a 5630 bp band while a successful integration at the 3' end of the *T. reesei* ire1 gene locus produces a 4707 bp band. The results of the spore PCR indicated that seventeen of the nineteen transformants had undergone a successful integration at both 5' and 3' ends of the *T. reesei* ire1 gene locus.

The ire1 replacement construct pSaMF128 contains the amdS gene and the HSV-1 tk gene as selection markers flanked by direct repeats. The direct repeats were inserted to facilitate the curing out of the amdS and HSV-1 tk genes and generate a clean ire1 gene locus with the Ala153Thr mutation. *T. reesei* strains SaMF128-1, SaMF128-2, and SaMF128-4 were grown on PDA plates at 28° C. for 7 days. Spores were collected from the plates using 0.01% TWEEN® and spread onto TrMM plates containing 1.5 µM 5-fluoro-2'-deoxyuridine (FdU) and incubated at 30° C. for 5 days. Fifteen isolates were sub-cultured onto PDA plates and incubated at 30° C. for 5 days. The isolates were then screened for the absence of the amdS selection marker gene by growing on COVE2 plates. Three isolates showed absence of growth on the COVE2 plates, indicating possible loss of amdS and HSV-1 tk selection marker genes.

After a round of single spore isolation on PDA plates, fungal spore PCR was performed as described above on each of the isolates to amplify the ire1 gene locus. The PCR screen was composed of 1.5 µl of the spore suspension, 12.5 pmol of primer 1222084, 12.5 pmol of primer 1222085, 10 µl of 2×PHIRE™ Plant PCR Buffer, and 0.4 µl of PHIRE™ Hot Start II DNA Polymerase in a 20 µl reaction. The reaction was incubated in a thermocycler programmed for 1 cycle at 98° C. for 5 minutes; 40 cycles each at 98° C. for 10 seconds, and 72° C. for 29 seconds; 1 cycle at 72° C. for 10 minutes; and a 10° C. hold. The resulting PCR fragment was treated with ExoSAP-IT™ (Applied Biosystems Inc.) and sequenced with a Model 377 XL Automated DNA Sequencer using dye-terminator chemistry (Giesecke et al., 1992, supra) to verify integration of the Ala153Thr mutation in the *T. reesei* ire1 gene. Genomic DNA was prepared as described in Example 1 and sequenced using 2×150 bp chemistry in NEXTSEQ™ 500 (Illumina Inc.). Sequencing identified transformant SaMF128-2A11-1 as containing the Ala153Thr mutation in the *T. reesei* ire1 gene and absence of the amdS and HSV-1 tk selection marker genes.

Example 6: Construction of Flp/FRT Integration Plasmid pAMFS210 for Expression of *Polyporus pinsitus* Laccase Expression plasmid pAMFS210 was constructed for integrating a *Polyporus pinsitus* laccase gene (SEQ ID NO: 28 for the cDNA sequence and SEQ ID NO: 29 for the deduced amino acid sequence) at each of four loci in *T. reesei* using the *Saccharomyces cerevisiae* flippase (FLP) and flippase recognition sequences FRT-F and FRT-F3. Two synthetic oligonucleotide primers shown below were designed to amplify by PCR the *P. pinsitus* laccase gene from plasmid pAMFS200 (WO 2016/090059) and introduce flanking regions for insertion into expression vector pJfyS165 (US 2018/0037897). Bold letters represent coding sequence and the remaining sequence is homologous to insertion sites of plasmid pJfyS165.

```
Forward primer 1210173:
                                 (SEQ ID NO: 30)
ACCGCGGACTGCGCACCATGTCGAGGTTTCACTC Reverse primer 1210174:
                                 (SEQ ID NO: 31)
GCCACGGAGCTTAATTACTACTGGTCGCTCGGGT
```

The PCR was composed of 200 ng of plasmid pAMFS200 DNA, 10 µl of 10 mM dNTPs, 50 pmol of primer 1210173, 50 pmol of primer 1210174, 1×PHUSION® HF buffer, and 2 units of PHUSION® Hot Start DNA polymerase in a final volume of 50 µl. The reaction was performed in a thermocycler programmed for 1 cycle at 98° C., for 30 seconds; 30 cycles each at 98° C. for 10 seconds, 62° C. for 10 seconds, and 72° C. for 1.5 minutes; and 1 cycle at 72° C. for 10 minutes. The PCR product was purified by 1% agarose gel electrophoresis using TAE buffer where a 1.5 kb fragment was excised from the gel, and agarose was extracted using a MIN-ELUTE® Gel Extraction Kit (QIAGEN Inc.).

Figure 4:
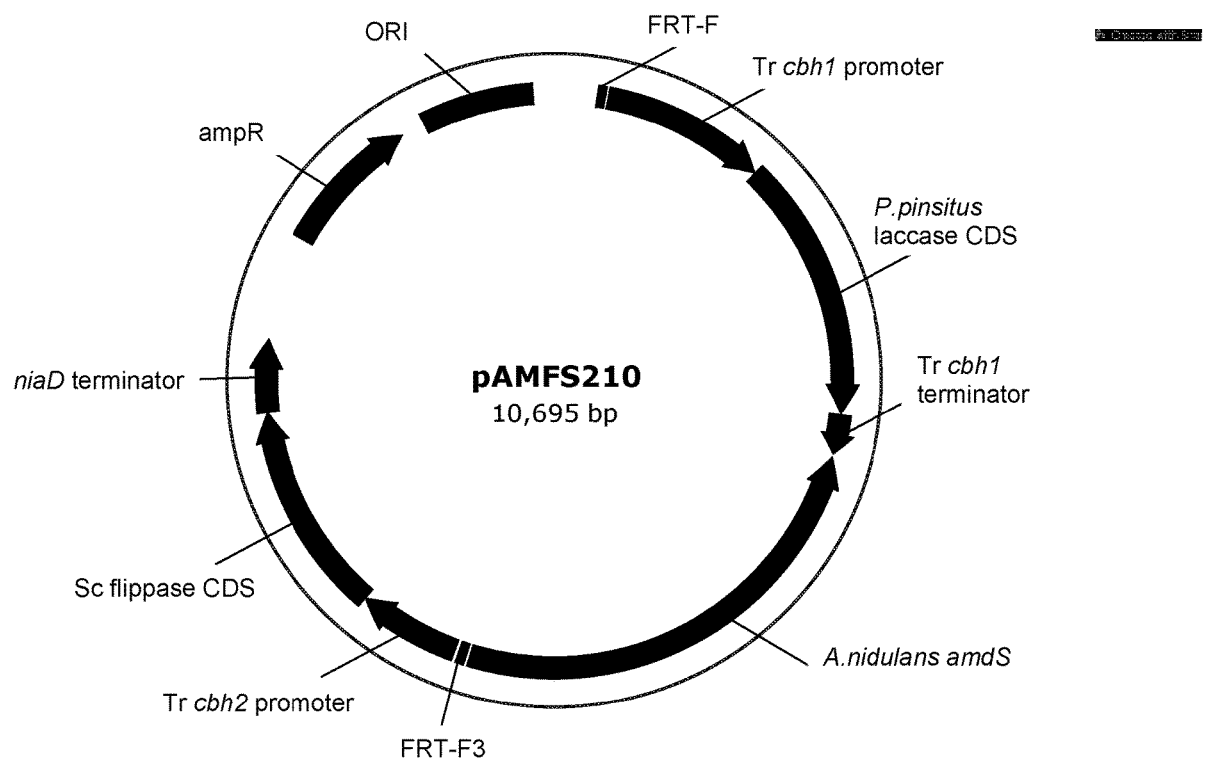
FIG. 4 shows a map of plasmid pAMFS210.

The 1.5 kb gene fragment of the *P. pinsitus* laccase coding sequence and the digested vector were ligated together in a reaction resulting in expression plasmid pAMFS210 composed of the *P. pinsitus* laccase coding sequence under transcriptional control of the *T. reesei* cbh1 promoter, FRT recognition sites for efficient targeting, and *S. cerevisiae* flippase coding sequence under control of the *T. reesei* cbh2 promoter. The ligation reaction (10 µl) was composed of 1× IN-FUSION™ HD enzyme mix, 200 ng of pJfyS165 digested with Nco I and Pac I, and 68 ng of the purified *P. pinsitus* laccase gene PCR product. The reaction was incubated at 50° C. for 15 minutes. A 2 µl volume of the reaction was transformed into ONE SHOT® TOP10 competent cells (Invitrogen). Transformants were inoculated into 3 ml of LB+Amp medium in a 14 ml round-bottom polypropylene tube and incubated at 37° C. overnight with shaking at 200 rpm. Plasmid DNA was isolated using a BIOROBOT® 9600. The insert was confirmed by DNA sequencing with a Model 377 XL Automated DNA Sequencer using dye-terminator chemistry (Giesecke et al., 1992, supra). One transformant containing the insert with no PCR errors was identified and the plasmid was designated pAMFS210 (FIG. 4).

Example 7: Construction of pAILo104

Plasmids pJfyS165 and pDM313 (U.S. 2018/0037897) were each digested with the restriction enzyme Bst XI and purified by 0.7% agarose gel electrophoresis using TAE buffer where an 8.2 kb DNA band from plasmid pJfyS165 and a 1.2 kb DNA band from plasmid pDM313 were excised from the gels, and extracted using a NUCLEOSPIN® Gel and PCR Clean-up Kit. The purified DNA fragments were quantitated using a QUBIT™ 2.0 Fluorimeter with a dsDNA Broad Range Assay Kit (Thermo Fisher Scientific).

Plasmid pAILo104 was assembled using a Thermo Scientific™ Rapid Ligation Kit using a vector:insert molar ratio of 1:3. One microliter of the ligation reaction was used to transform 50 µl of STELLAR™ chemically competent *E. coli* cells. The cells were heat shocked at 42° C. for 45 seconds after which 100 µl of SOC medium were added. The transformation was then incubated at 37° C. with constant shaking at 200 rpm for 60 minutes. A 100 µl aliquot of the transformation was then spread onto a 150 mm 2XYT+Amp plate and incubated at 37° C. overnight. Twenty-four of the resulting *E. coli* transformants were individually inoculated into 3 ml of LB+Amp medium in 14 ml round-bottom polypropylene tubes and incubated at 37° C. overnight with shaking at 300 rpm. Plasmid DNA was isolated using a BIOROBOT® 9600. Putative recombinant clones were analyzed by restriction digestion with BstXI. One of the clones that had the correct restriction pattern was selected and designated plasmid pAILo104. To further confirm the sequence of pAILo104 the whole plasmid was sequenced by next-generation sequencing using a NEXTSEQ™ 500 System with a 2×150 bp output mode (Illumina Inc.).

Example 8: Construction of pAILo105

To add a Simian virus 40 (SV40) T antigen nuclear localization sequence (SV40-NLS) to the *Saccharomyces*

*cerevisiae* flippase, an 840 bp Pae I/Psr I restriction fragment from pAILo104 was removed by restriction digestion and gel purification. An in-silico model of the 840 bp fragment was split in two immediately before the *S. cerevisiae* flippase stop codon (TGA) and the following sequence comprising the SV40-NLS was added to the right and left side of the split fragment.

```
                                      (SEQ ID NO: 32)
    CCCAAGAAGAAGCGCAAGGTC (SEQ ID NO: 33)
    PKKKRKV
```

These in-silico models were then used to generate PCR primers to amplify the 840 bp fragment with the newly added SV40-NLS and clone them back into a Pae I/Psr I digested pAILo104 backbone.

```
    Primers for left side:
    Forward primer:
                                      (SEQ ID NO: 34)
    GAACGCCCCTACTCCATCTTCGCCATCAAGAACGGCCCCAA Reverse primer:
                                      (SEQ ID NO: 35)
    GACCTTGCGCTTCTTCTTGGGGATGCGGCGGTTGATGTAGG
    Bold sequence represents the newly added
    nucleotide sequence of the SV40-NLS.

Primers for right side:
    Forward primer:
                                      (SEQ ID NO: 36)
    CCCAAGAAGAAGCGCAAGGTCTGAGTCGAGATTATCCAAGG Reverse primer:
                                      (SEQ ID NO: 37)
    GTTTAAACTCTAGGATGCATGCAAGTGAGGCTATTGCCTAT
    Bold sequence represents the newly added
    nucleotide sequence of the SV40-NLS.
```

PCRs for the left and right sides were composed of 15 ng of plasmid pJfyS165 DNA, 200 μM dNTPs, 0.5 μM primers, 1×PHUSION® Reaction Buffer (Thermo Fisher Scientific, Inc.), and 2 units of PHUSION® High Fidelity DNA polymerase (Thermo Fisher Scientific, Inc.) in a final volume of 50 μl. The reaction was performed in a thermocycler programmed for 1 cycle at 98° C. for 2 minutes; 30 cycles each at 98° C. for 5 seconds, 60° C. for 10 seconds, and 72° C. for 30 seconds; and 1 cycle at 72° C. for 5 minutes. The reactions were purified by 0.7% agarose gel electrophoresis using TAE buffer where bands of 424 bp (left fragment) and 470 bp (right fragment) were excised from the gels, and extracted using a NUCLEOSPIN® Gel and PCR Clean-up Kit. The purified DNAs were quantitated using a QUBIT™ 2.0 Fluorimeter with a dsDNA Broad Range Assay Kit.

The Psr I/Pae I restriction digest of pAILo104 to generate the cloning backbone was accomplished in sequential digests to account for restriction buffer incompatibilities.

The Psr I restriction digest was composed of 5 μg of plasmid pAILo104, 1×SibY restriction buffer (SibEnzyme Ltd.) 1×BSA, 5 units of Psr I restriction enzyme and water up to 200 μl. The reaction was incubated at 30° C. overnight and then at 65° C. for 20 minutes to heat inactivate the enzyme and then gel purified as described above.

The Pae I restriction digest was composed of 40 μl of the Pae I restriction digestion, 1× Fast Green buffer (Thermo Fisher Scientific, Inc.), 4 units of Pae I, and water to 100 μl. The reaction was incubated at 37° C. for 60 minutes and then gel purified as described above.

Cloning of the fragments containing the SV40-NLS was achieved with a NEBUILDER® HiFi DNA Assembly Kit. The reaction was composed of plasmid pAILo105 backbone and the left and right fragments at a ratio of 1:2 (0.07 pmol: 0.14 pmol) for a total mass of 0.21 pmols, and 1× HiFi master mix in total volume of 20 μl. The reaction was incubated at 50° C. for 30 minutes and then on ice for 2 minutes. Two microliters of the HiFi reaction were used to transform NEB 5-ALPHA™ competent cells (New England Biolabs). The cells were heat shocked at 42° C. for 30 seconds after which 950 μl of SOC medium were added. The transformation was then incubated at 37° C. with constant shaking at 200 rpm for 60 minutes. A 100 μl aliquot of the transformation was then spread onto a 150 mm 2XYT+Amp plate and incubated at 37° C. overnight. Eight colonies were selected at random and plasmid DNA was prepared with a BIOROBOT® 9600. Putative recombinant clones were analyzed by restriction digestion with Bcg 1. One of the clones with the correct restriction pattern was selected at random and designated plasmid pAILo105. To further confirm the correct assembly of pAILo105 the plasmid was sequenced by Sanger using the same primers used to PCR amplify this region: SEQ ID NO: 35 and SEQ ID NO: 38. Sequence analysis was performed with SNAPGENE® version 4.0 (SnapGene). Sanger reads were aligned to an in-silico model of pAILo105 which showed that the SV40-NLS had been successfully added at the end of the flippase gene.

Example 9: Construction of pAILo106

Plasmid pAILo5 (Example 8) was digested with Xba I and Kfl I to remove a fragment containing the cbh1 promoter, the cbh1 terminator, and approximately 1.8 kb of the 3' end of the amdS gene. The restriction digestion reaction was composed of 5 μg of plasmid pAILo105 DNA, 1× Fast Green buffer (Thermo Fisher Scientific, Inc.), 5 units of Xba I, and 5 units of Kfl I, and water to 100 μl. The reaction was incubated at 37° C. for 60 minutes and then gel purified as described in Example 8. The replacement fragment containing the cbh2 promoter and terminator and approximately 1.8 kb of the 3' end of the amdS gene was PCR amplified from plasmid pJfyS143 (US 2018/0037897) with the following primers.

```
                                      (SEQ ID NO: 38)
    CTATTCCGAGTTCCTATTCTCTAGAAAGTATAGGAACTTCGAATTCTAGG

CTAGGTATGC (SEQ ID NO: 39)
    ATCGCCCAGCAGTTAGTAGGGTCCC
```

The PCR was composed of 20 ng of plasmid pJfyS143 DNA, 200 μM dNTPs, 0.5 μM primers, 1×PHUSION® Reaction Buffer, and 2 units of PHUSION® High Fidelity DNA polymerase in a final volume of 50 μl. The reaction was performed in a thermocycler programmed for 1 cycle at 98° C. for 2 minutes; 35 cycles each at 98° C. for 5 seconds, 68° C. for 10 seconds, and 72° C. for 3 minutes; and 1 cycle at 72° C. for 5 minutes. The reaction was purified by 0.7% agarose gel electrophoresis with TAE buffer where a band of 2819 bp was excised from the gel, and extracted using a using a NUCLEOSPIN® Gel and PCR Clean-up Kit. The assembly of the new vector was performed with a NEBUILDER® HiFi DNA Assembly Kit. The reaction was composed of plasmid pAILo105 backbone and the replacement fragment at a ratio of 1:3 (0.023 pmol: 0.07 pmol) for a total mass of 0.21 pmole, and 1× HiFi master mix in total volume of 20 μl. The reaction was incubated at 50° C. for 30 minutes and then on ice for 2 minutes.

Two microliters of the HiFi reaction were used to transform SOLOPACK™ Supercompetent Cells (Agilent Technologies). The cells were heat shocked at 42° C. for 30 seconds afterwhich 250 μl of SOC medium were added. The transformation was then incubated at 37° C. with constant shaking at 200 rpm for 60 minutes. A 100 μl aliquot of the transformation was then spread onto a 150 mm 2XYT+Amp plate and incubated at 37° C. overnight. Sixteen colonies were selected at random and plasmid DNA was prepared with a BIOROBOT® 9600. Putative recombinant clones were analyzed by restriction digestion with Xba I and Kfl I. Clones 9 and 15 were observed to have the correct restriction pattern and were selected for sequencing by Illumina technology as described in Example 7. Sequence analysis was performed with the CLC Genomics Workbench version 11.0.0 (QIAGEN Inc.). Reads were mapped to in-silico models of the expected pAILo106 sequence using the Map Reads to Reference module with a high-stringency setting. A total of 180,627 reads out of 191,566 reads were successfully mapped producing a 100% coverage of the model with a read deep of 4485±354. Analysis of clone number 9 with Basic Variant Detector Module showed that it had a single nucleotide polymorphism at position 318. This clone was discarded. Analysis of clone 15 show that a total of 187,208 reads out of 192,552 reads were successfully mapped producing a 100% coverage of the model with a read deep of 4,791±418. The Basic Variant Detector showed that clone 15 had the expected sequence for plasmid pAILo106. Clone 15 was renamed plasmid pAILo106.

Example 10: Construction of Plasmid pAILo108

Plasmid pAILo108 is a derivative of plasmid pAILo106 where the *Saccharomyces cerevisiae* flippase gene is driven by the *Aspergillus nidulans* gpdA promoter instead of the *T. reesei* gpdA promoter.

Plasmid pAILo106 was digested with Bst XI to remove a 1.2 kb fragment containing the *T. reesei* gpdA promoter and a 264 bp fragment of the *S. cerevisiae* flippase gene. The 1.2 kb fragment was replaced by a fragment containing the original 264 bp fragment of the *S. cerevisiae* flippase gene and a 1.2 kb fragment containing the *Aspergillus nidulans* gpdA promoter.

A DNA fragment containing the *Aspergillus nidulans* gpdA promoter was amplified by PCR from *Aspergillus nidulans* genomic DNA using the following primers.

```
                                      (SEQ ID NO: 40)
ATAGGAACTTCAGATATCCATCACACTGGGAGTACCATTTAATTCTATTT

GTGTTTGATCGAGAC
```

```
                                      (SEQ ID NO: 41)
CGAACTGGGGCATGGTGATGTCTGCTCAAGCGG
```

The PCR was composed of 180 ng of *Aspergillus nidulans* genomic DNA, 200 μM dNTPs, 0.5 μM primers, 1×PHUSION® Reaction Buffer, and 2 units of PHUSION® High Fidelity DNA polymerase in a final volume of 50 μl. The reaction was performed in a thermocycler programmed for 1 cycle at 98° C. for 2 minutes; 35 cycles each at 98° C. for 5 seconds, 60° C. for 10 seconds, and 72° C. for 3 minutes; and 1 cycle at 72° C. for 5 minutes. The reaction was purified by 0.7% agarose gel electrophoresis with TAE buffer where a DNA band of 1267 bp was excised from the gel, and extracted using a using a NUCLEOSPIN® Gel and PCR Clean-up Kit.

A DNA fragment to repair the *S. cerevisiae* flippase gene was amplified by PCR from plasmid pAILo105 using the following primers.

```
                                      (SEQ ID NO: 42)
GCAGACATCACCATGCCCCAGTTCGATATCCTCT
```

```
                                      (SEQ ID NO: 43)
CTTCTTGAGGGAGGCCTCCAGGATGGTGGCCTTCTGG
```

The PCR was composed of 10 ng of plasmid pAILo105 DNA, 200 μM dNTPs, 0.5 μM primers, 1×PHUSION® Reaction Buffer, and 2 units of PHUSION® High Fidelity DNA polymerase in a final volume of 50 μl. The reaction was performed in a thermocycler programmed for 1 cycle at 98° C. for 2 minutes; 35 cycles each at 98° C. for 5 seconds, 60° C. for 10 seconds, and 72° C. for 3 minutes; and 1 cycle at 72° C. for 5 minutes. The reaction was purified by 0.7% agarose gel electrophoresis with TAE buffer where a DNA band of 297 bp was excised from the gel, and extracted using a NUCLEOSPIN® Gel and PCR Clean-up Kit.

The assembly of pAILo108 was performed with the NEBUILDER® HiFi DNA Assembly Kit. The reaction was composed of 100 ng of Bst XI digested pAILo106, 6.9 ng of the 264 bp fragment of the *S. cerevisiae* flippase gene, 29.8 ng of the 1.2 kb *A. nidulans* gpdA promoter fragment, and 1×HiFi master mix in total volume of 20 μl. The reaction was incubated at 50° C. for 30 minutes and then on ice for 2 minutes.

Two microliters of the reaction were transformed into SOLOPACK™ Supercompetent Cells. The cells were heat shocked at 42° C. for 30 seconds after which 250 μl of SOC medium were added. The transformation was then incubated at 37° C. with constant shaking at 200 rpm for 60 minutes. A 100 μl aliquot of the transformation was then spread onto a 150 mm 2XYT+Amp plate and incubated at 37° C. overnight. Twelve colonies per plasmid were selected at random and plasmid DNA was prepared with a BIOROBOT® 9600. Putative recombinant clones were analyzed by restriction digestion with Sca I.

Two clones for each plasmid with the correct restriction pattern were selected for sequencing by Illumina technology as described in Example 7. Sequence analysis was performed with the CLC Genomics Workbench version 11.0.0 (QIAGEN Inc.). Reads were mapped to an in-silico model of the expected pAILo108 sequence using the Map Reads to Reference module with a high-stringency setting. A total of 103,574 reads were successfully mapped producing a 100% coverage of the pAILo106 model with an average read deep of 2640±321. Analysis with the Basic Variant Detector Module showed that clone 108-15 had the expected sequence for plasmid pAILo108.

Example 11: Construction of Flp/FRT Integration "Empty" Plasmid pNJOC381

Plasmid pNJOC381 is an "empty" plasmid with a non-functional amdS gene and lacks the *Polyporus pinsitus* laccase expression cassette. The plasmid was constructed for integration at each of four loci in *T. reesei* using the *Saccharomyces cerevisiae* flippase (FLP) and flippase recognition sequences FRT-F and FRT-F3.

Plasmid pNJOC381 was constructed from pAILo108 (Example 10) by replacement of the amdS gene with a truncated amdS cassette lacking the promoter and the start codon ATG of the amdS gene. The plasmid was assembled from two PCR products. The pAILo108 plasmid backbone and the truncated amdS cassette were PCR amplified from pAILo108 using the primer sets NJ91 with NJ92 and NJ93 with NJ94, respectively, shown below.

```
Primer NJ91:
                                       (SEQ ID NO: 44)
caagggcgaattctgcattg Primer NJ92:
                                       (SEQ ID NO: 45)
gaagttcctatactttctagagaataggaactcggaataggaacttcaag atgaattcgc Primer NJ93:
                                       (SEQ ID NO: 46)
ctagaaagtataggaacttcAAGCTTtggaaacgcaaccctgaag Primer NJ94:
                                       (SEQ ID NO: 47)
caatgcagaattcgccttgcctcaatcctgggaagaactg
```

The PCRs were composed of 5 ng of plasmid pAILo108 DNA as template, 1×HF buffer, 200 µM of each dNTP, 500 nM forward primer, 500 nM reverse primer, and 1 unit of PHUSION® Hot Start II DNA Polymerase. The reactions were incubated in a thermocycler programmed for 1 cycle at 98° C. for 3 minutes; 35 cycles each at 98° C. for 10 seconds, 55° C. for 30 seconds, and 72° C. for 2 minutes; and 1 cycle at 72° C. for 5 minutes. Following thermocycling, the PCR products were separated by 1% agarose gel electrophoresis using TBE buffer where 5770 bp and 2117 bp bands corresponding to the pAILo108 backbone and truncated amdS cassette, respectively, were excised from the gels and purified using a NUCLEOSPIN® Gel and PCR Clean-up Kit.

The two PCR products were ligated together using a NEBUILDER® HiFi DNA Assembly Cloning Kit in a total volume of 20 µl composed of 1×NEBUILDER® HiFi Assembly Master Mix and 0.05 pmol of each PCR product. The reaction was incubated at 50° C. for 15 minutes and then placed on ice. One µl of the reaction was used to transform 60 µl of STELLAR™ chemically competent *E. coli* cells. The transformation reaction was spread onto two 2XYT+ Amp plates and incubated at 37° C. overnight. Putative transformant colonies were isolated from the selection plates and plasmid DNA was prepared from each one using a QIAPREP® Spin Miniprep Kit and screened for proper insertion of the fragments by digestion with Pvu II. A plasmid yielding the desired band sizes (3439 bp, 2364 bp, and 2044 bp) was confirmed to be correct by DNA sequencing and designated pNJOC381.

Example 12: Generation of *Polyporus pinsitus* Laccase Overexpressing Strains Strains overexpressing the *Polyporus pinsitus* laccase gene in *Trichoderma reesei* FRT4New-8G4A (native ire1 gene) and *T. reesei* SaMF128-2A11-1 (ire1 Ala153Thr mutant) as hosts were constructed according to the following procedure.

*Trichoderma reesei* FRT4New-8G4A and *T. reesei* SaMF128-2A11-1 protoplasts were generated and co-transformed with 5 µg of plasmid pAMF210 (Example 5) and 3 µg of plasmid pNJOC381 (Example 11) for each transformation reaction according to Example 2 to generate strains with 1, 2, 3, and/or 4-copies of *Polyporus pinsitus* laccase gene. The transformation was spread onto COVE plates and incubated at 30° C. until transformants appeared. Using Whatman™ 150 mm sterile filter paper (GE Healthcare UK Limited), spores from transformants from each COVE plate were replicate plated onto TrMM plates containing 75 µg/ml 5-fluorocytosine (5-FC) (Sigma Chemical Co.) and incubated at 30° C. for 6 days. Thirty-five 5-FC resistant isolates from *T. reesei* FRT4New-8G4A and twenty-eight 5-FC resistant transformants from *T. reesei* SaMF128-2A11-1 were sub-cultured onto new TrMM plates containing 75 µg/ml 5-FC.

A fungal multiplex spore PCR method using a PHIRE™ Plant Direct PCR Kit was used to screen the 5-FC resistant transformants to determine the *Polyporus pinsitus* laccase gene copy number. The PCR was performed using a common forward primer targeting the beginning of the amdS gene and a set of reverse primers (one for each locus) as shown below.

```
Forward primer NJ100:
                                       (SEQ ID NO: 48)
gttcttcccaggattgagg Reverse primer NJ101:
                                       (SEQ ID NO: 49)
ggtactgggatacacgaagagc Reverse primer NJ102:
                                       (SEQ ID NO: 50)
atcagtacagccatgttgcac Reverse primer NJ103:
                                       (SEQ ID NO: 51)
gagaagactttggacgcagtg Reverse primer NJ104:
                                       (SEQ ID NO: 52)
atgatacctactgataccgacaacc
```

The PCR product sizes for the different loci was controlled by placing the locus-specific reverse primers at different distances away from the amdS gene. Loci containing the pAMFS210 expression construct will give rise to longer PCR product sizes relative to loci containing empty construct pNJOC381, which lacks the amdS promoter and the start codon (Table 1). Consequently, the PCR strategy allowed for simultaneous verification of *Polyporus pinsitus* laccase gene integration at the cbh1, cbh2, eg1, and/or xyn2 loci and served as a simple method for copy number determination.

TABLE 1

Expected PCR product sizes from a fungal multiplex spore PCR

|  | With expression cassette (pAMFS210) | With empty cassette (pNJOC381) |
|---|---|---|
| cbh1 locus [NJ100 + 101] | 847 bp | 200 bp |
| cbh2 locus [NJ100 + 102] | 947 bp | 300 bp |
| eg1 locus [NJ100 + 103] | 1047 bp | 400 bp |
| xyl2 locus [NJ100 + 104] | 1197 bp | 550 bp |

The multiplex spore PCR was performed by collecting spores with a sterile 1 µl inoculation loop and transferring them to 20 µl of Dilution buffer (PHIRE™ Plant Direct PCR Kit) in a 0.6 ml tube. The reaction was composed of 0.5 µl of the spore suspension, 2 pmol of common forward primer NJ100, 0.5 pmol each of the reverse primers NJ101, NJ102, NJ103 and NJ104, 5 µl of 2×PHIRE™ Plant PCR Buffer, and 0.2 µl of PHIRE™ Hot Start II DNA Polymerase in a 20

µl reaction. The reaction was incubated in a thermocycler programmed for 1 cycle at 98° C. for 5 minutes; 40 cycles each at 98° C. for 5 seconds, 55° C. for 5 seconds, and 72° C. for 40 seconds; 1 cycle at 72° C. for 2 minutes; and a 4° C. hold. The completed PCRs were analyzed by 1.5% agarose gel electrophoresis using TAE buffer.

The results of the multiplex spore PCRs identified transformants with only 1-copy and 2-copies of the *Polyporus pinsitus* laccase gene from *T. reesei* FRT4New-8G4A (native ire1 gene) as host and transformants with 2-, 3-, and 4-copies of the *Polyporus pinsitus* laccase gene from *T. reesei* SaMF128-2A11-1 (Ala153Thr ire1 mutant) as host. The strains were single spore isolated on COVE plates and multiplex spore PCR was again performed as described above to verify the *Polyporus pinsitus* laccase gene copy number.

Example 13: Laccase Activity Assay

Culture supernatants were diluted appropriately in 0.1 M sodium acetate, 0.01% TRITON™ X-100 (4-(1,1,3,3-tetramethylbutyl)phenyl-polyethylene glycol) pH 5.0 buffer (sample buffer) followed by a series dilution from 0-fold to 1/3-fold to 1/9-fold of the diluted sample. A laccase standard was diluted appropriately with the sample buffer and included with the samples. A total of 20 µl of each dilution and standard sample was transferred to wells of a 96-well flat bottom microtiter plate. Two hundred µl of an ABTS (2,2'-azino-bis(3-ethylbenzthiazoline-6-sulfonic acid)) substrate solution (0.1 M sodium acetate pH 5.0 plus 0.275 mg/ml ABTS plus 0.01% TRITON™ X-100) were added to each well and then incubated at ambient temperature for 30 minutes. During the incubation, the rate of the reaction was measured at an optical density of 405 nm using a SPECTRAMAX® plate reader (Molecular Devices LLC) for the 96-well plate. Sample concentrations were determined by extrapolation from a generated standard curve.

Example 14: Comparing *Polyporus pinsitus* Laccase Productivity in *Trichoderma reesei* FRT4New-8G4A (Native Ire1) and *T. reesei* SaMF128-2A11-1 (Ire1 Ala153Thr Mutant)

The single spore isolated *Polyporus pinsitus* laccase expressing strains (Example 12) were cultivated in 2 ml of CIM medium containing 2% lactose and 0.25 mM CuSO$_4$.5H$_2$O in a Whatman™ 24-well polypropylene round bottom microplate for 3 days at 30° C. with shaking at 250 rpm. After 3 days growth, the liquid culture medium was assayed for *P. pinsitus* laccase activity as described in Example 13. In the strains with 2-copies of the *P. pinsitus* laccase gene, relative improvements in *P. pinsitus* laccase expression yield in *T. reesei* SaMF128-2A11-1 (ire1 Ala153Thr mutant) was 1.6 times greater compared to *T. reesei* FRT4New-8G4A (native ire1).

Example 15: Lab-Scale 2 Liter Fermentation Confirmation of Improved Expression of *Polyporus pinsitus* Laccase The two-copy *Polyporus pinsitus* laccase gene strains generated from *T. reesei* FRT4New-8G4A (native ire1) and *T. reesei* SaMF128-2A11-1 (ire1 Ala153Thr mutant) were evaluated in 2 liter fermentations. Each strain was grown on a PDA plate for 4-7 days at 30° C. Three 500 ml shake flasks each containing 100 ml of Shake Flask medium were inoculated with two plugs from a PDA plate. The shake flasks were incubated at 28° C. for 48 hours on an orbital shaker at 250 rpm. The cultures were used as seed for fermentation.

A total of 160 ml of each seed culture was used to inoculate 3-liter glass jacketed fermentors (Applikon Biotechnology) containing 1.6 liters of Fermentation batch medium. The fermentors were maintained at a temperature of 28° C. and pH was controlled using an Applikon 1030 control system to a set-point of 3.5+/−0.1. Air was added to the vessel at a rate of 2.5 L/min and the broth was agitated by Rushton impeller rotating at 1100 rpm. Fermentation feed medium composed of dextrose and phosphoric acid was dosed at a rate of 0 to 10 g/L/hour for a period of 165 hours. Samples were taken on days 3, 4, 5, 6, and 7 of the fermentation run and centrifuged at 3000×g to remove the biomass. The supernatants were stored at 5 to 10° C.

The *P. pinsitus* laccase expression level was determined on the supernatant samples as described in Example 13. A 2.82× increase in *P. pinsitus* laccase activity in the strain with A153T ire1 mutation containing 2-copies of the *P. pinsitus* laccase gene was observed compared to the strain with wild-type ire1 containing 2-copies of the *P. pinsitus* laccase gene (Table 2). Increasing the laccase gene copies to 3 or 4 did not result in higher expression of laccase in the A153T ire1 mutation strain.

TABLE 2

Comparing relative laccase activity between wild-type ire1 and A153T ire1 variant host at 7 days

| Strain | *P. pinsitus* laccase gene copy number | Relative laccase Activity |
|---|---|---|
| Wild-type ire1 | 1 | 1.00 |
| Wild-type ire1 | 2 | 0.96 |
| A153T ire1 variant | 2 | 2.82 |
| A153T ire1 variant | 3 | 1.77 |
| A153T ire1 variant | 4 | 1.74 |

The invention described and claimed herein is not to be limited in scope by the specific aspects herein disclosed, since these aspects are intended as illustrations of several aspects of the invention. Any equivalent aspects are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control.

The invention is further defined by the following numbered paragraphs:

Paragraph 1. An isolated variant Ire1 polypeptide, comprising (a) an amino acid substitution at position 153 of the *Trichoderma reesei* Ire1 polypeptide of SEQ ID NO: 2; or (b) an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

Paragraph 2. The variant Ire1 polypeptide of paragraph 1, wherein the substitution at position 153 or a position corresponding to position 153 is with Thr.

Paragraph 3. The variant Ire1 polypeptide of paragraph 1, wherein an Ala at position 153 or a position corresponding to position 153 is substituted with Thr.

Paragraph 4. The variant Ire1 polypeptide of any one of paragraphs 1-3, which further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

Paragraph 5. The variant Ire1 polypeptide of any one of paragraphs 1-4, wherein the variant Ire1 polypeptide has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

Paragraph 6. An isolated polynucleotide, comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

Paragraph 7. The polynucleotide of paragraph 6, wherein the substitution at position 153 or a position corresponding to position 153 is with Thr.

Paragraph 8. The polynucleotide of paragraph 6, wherein an Ala at position 153 or a position corresponding to position 153 is substituted with Thr.

Paragraph 9. The polynucleotide of any one of paragraphs 6-8, wherein the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

Paragraph 10. The polynucleotide of any one of paragraphs 6-9, wherein the variant Ire1 polypeptide has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

Paragraph 11. A nucleic acid construct comprising the polynucleotide of any one of paragraphs 6-10.

Paragraph 12. An expression vector comprising the nucleic acid construct of paragraph 11.

Paragraph 13. A variant Ire1 polypeptide encoded by the polynucleotide of any one of paragraphs 6-10.

Paragraph 14. A recombinant filamentous fungal host cell, comprising and expressing a first polynucleotide encoding a secreted heterologous polypeptide of interest and a second polynucleotide comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

Paragraph 15. The recombinant filamentous fungal host cell of paragraph 14, wherein the substitution at position 153 or a position corresponding to position 153 is with Thr.

Paragraph 16. The recombinant filamentous fungal host cell of paragraph 14, wherein an Ala at position 153 or a position corresponding to position 153 is substituted with Thr.

Paragraph 17. The recombinant filamentous fungal host cell of any one of paragraphs 14-16, wherein the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

Paragraph 18. The recombinant filamentous fungal host cell of any one of paragraphs 14-17, wherein the variant Ire1 polypeptide has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

Paragraph 19. The recombinant filamentous fungal host cell of any one of paragraphs 14-18, which is of a genus selected from the group consisting of *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes* and *Trichoderma*.

Paragraph 20. The recombinant filamentous fungal host cell of any one of paragraphs 14-18, which is a *Trichoderma* cell.

Paragraph 21. The recombinant filamentous fungal host cell of paragraph 20, wherein the *Trichoderma* cell is a *Trichoderma harzianum, Trichoderma koningii, Trichoderma longibrachiatum, Trichoderma reesei,* or *Trichoderma viride* cell.

Paragraph 22. The recombinant filamentous fungal host cell of paragraph 20, wherein the *Trichoderma* cell is a *Trichoderma reesei* cell.

Paragraph 23. The recombinant filamentous fungal host cell of any one of paragraphs 14-22, wherein the heterologous polypeptide of interest is an enzyme selected from the group consisting of a hydrolase, an isomerase, a ligase, a lyase, an oxidoreductase, or a transferase.

Paragraph 24. The recombinant filamentous fungal host cell of any one of paragraphs 14-22, wherein the heterologous polypeptide of interest is an acetylmannan esterase, acetyxylan esterase, aminopeptidase, alpha-amylase, arabinanase, arabinofuranosidase, beta-amylase, carbohydrase, carboxypeptidase, catalase, cellobiohydrolase, cellulase, chitinase, coumaric acid esterase, cyclodextrin glycosyltransferase, cutinase, cyclodextrin glycosyltransferase, deoxyribonuclease, endoglucanase, esterase, feruloyl esterase, lytic polysaccharide monooxygenase, alpha-galactosidase, beta-galactosidase, glucocerebrosidase, glucose oxidase, alpha-glucosidase, beta-glucosidase, glucuronidase, glucuronoyl esterase, haloperoxidase, hemicellulase, invertase, isomerase, laccase, ligase, lipase, mannanase, mannosidase, mutanase, oxidase, pectinolytic enzyme, peroxidase, phospholipase, phytase, phenoloxidase, polyphenoloxidase, proteolytic enzyme, ribonuclease, alpha-1,6-transglucosidase, transglutaminase, urokinase, xylanase, or beta-xylosidase.

Paragraph 25. A method of producing a secreted heterologous polypeptide of interest, said method comprising the steps of: (a) cultivating the recombinant filamentous fungal host cell of any one of paragraphs 14-24 under conditions suitable for the production and secretion of the heterologous polypeptide; and, optionally (b) recovering the secreted heterologous polypeptide of interest.

Paragraph 26. A method of improving the productivity or yield of a secreted heterologous polypeptide of interest in a filamentous fungal host cell, said method comprising the steps of: (a) providing a filamentous fungal host cell comprising and expressing an ire1 gene encoding an Ire1 polypeptide; and (b) mutating the ire1 gene to provide a mutated ire1 gene that encodes a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 70%, but less than 100%, sequence identity to the amino acid sequence of SEQ ID NO: 2.

Paragraph 27. The method of paragraph 26, wherein the substitution at position 153 or a position corresponding to position 153 is with Thr.

Paragraph 28. The method of paragraph 26, wherein an Ala at position 153 or a position corresponding to position 153 is substituted with Thr.

Paragraph 29. The method of any one of paragraphs 26-28, wherein the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

Paragraph 30. The method of any one of paragraphs 26-29, wherein the variant Ire1 polypeptide has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99%, but less than 100%, sequence identity to the amino acid sequence of SEQ ID NO: 2.

Paragraph 31. The method of any one of paragraphs 26-30, wherein the filamentous fungal host cell is of a genus selected from the group consisting of *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes* and *Trichoderma*.

Paragraph 32. The method of any one of paragraphs 26-30, wherein the filamentous fungal host cell is a *Trichoderma* cell.

Paragraph 33. The method of paragraph 32, wherein the *Trichoderma* cell is a *Trichoderma harzianum, Trichoderma koningii, Trichoderma longibrachiatum, Trichoderma reesei,* or *Trichoderma viride* cell.

Paragraph 34. The method of paragraph 32, wherein the *Trichoderma* cell is a *Trichoderma reesei* cell.

Paragraph 35. The method of any one of paragraphs 26-34, wherein the heterologous polypeptide of interest is an enzyme selected from the group consisting of a hydrolase, an isomerase, a ligase, a lyase, an oxidoreductase, or a transferase.

Paragraph 36. The method of any one of paragraphs 26-34, wherein the heterologous polypeptide of interest is an acetylmannan esterase, acetyxylan esterase, aminopeptidase, alpha-amylase, arabinanase, arabinofuranosidase, beta-amylase, carbohydrase, carboxypeptidase, catalase, cellobiohydrolase, cellulase, chitinase, coumaric acid esterase, cyclodextrin glycosyltransferase, cutinase, cyclodextrin glycosyltransferase, deoxyribonuclease, endoglucanase, esterase, feruloyl esterase, lytic polysaccharide monooxygenase, alpha-galactosidase, beta-galactosidase, glucocerebrosidase, glucose oxidase, alpha-glucosidase, beta-glucosidase, glucuronidase, glucuronoyl esterase, haloperoxidase, hemicellulase, invertase, isomerase, laccase, ligase, lipase, mannanase, mannosidase, mutanase, oxidase, pectinolytic enzyme, peroxidase, phospholipase, phytase, phenoloxidase, polyphenoloxidase, proteolytic enzyme, ribonuclease, alpha-1,6-transglucosidase, transglutaminase, urokinase, xylanase, or beta-xylosidase.

---

What is claimed is:

1. An isolated variant Ire1 polypeptide, comprising (a) an amino acid substitution at position 153 of the *Trichoderma reesei* Ire1 polypeptide of SEQ ID NO: 2; or (b) an amino acid substitution at a position corresponding to position 153 of the *Trichoderma reesei* Ire1 of SEQ ID NO: 2 and has at least 85% but less than 100% sequence identity to the amino acid sequence of SEQ ID NO: 2.

2. The variant Ire1 polypeptide of claim 1, wherein the substitution at position 153 or a position corresponding to position 153 is with Thr.

3. The variant Ire1 polypeptide of claim 1, wherein an Ala at position 153 or a position corresponding to position 153 is substituted with Thr.

4. The variant Ire1 polypeptide of claim 1, which further comprises a Thr at position 150of the Trichoderma reesei Ire1 polypeptide of SEQ ID NO: 2 or a Thr at a position corresponding to position 150 of the *Trichoderma reesei* Ire1 of SEQ ID NO: 2.

5. An isolated polynucleotide, comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 85% but less than 100% sequence identity to the amino acid sequence of SEQ ID NO: 2.

6. The polynucleotide of claim 5, wherein the substitution at position 153 or a position corresponding to position 153 is with Thr.

7. The polynucleotide of claim 5, wherein an Ala at position 153 or a position corresponding to position 153 is substituted with Thr.

8. The polynucleotide of claim 5, wherein the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

9. A nucleic acid construct comprising the polynucleotide of claim 5.

10. A recombinant filamentous fungal host cell, comprising and expressing a first polynucleotide encoding a secreted heterologous polypeptide of interest and a second polynucleotide comprising a mutated ire1 gene encoding a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 85% but less than 100% sequence identity to the amino acid sequence of SEQ ID NO: 2.

11. The recombinant filamentous fungal host cell of claim 10, wherein the substitution at position 153 or a position corresponding to position 153 is with Thr.

12. The recombinant filamentous fungal host cell of claim 10, wherein an Ala at position 153 or a position corresponding to position 153 is substituted with Thr.

13. The recombinant filamentous fungal host cell of claim 10, wherein the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

14. The recombinant filamentous fungal host cell of claim 10, which is of a genus selected from the group consisting of *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes* and *Trichoderma*.

15. A method of producing a secreted heterologous polypeptide of interest, said method comprising the steps of:
(a) cultivating the recombinant filamentous fungal host cell of claim 10 under conditions suitable for the production and secretion of the heterologous polypeptide; and, optionally
(b) recovering the secreted heterologous polypeptide of interest.

16. A method of improving the productivity or yield of a secreted heterologous polypeptide of interest in a filamentous fungal host cell, said method comprising the steps of:

(a) providing a filamentous fungal host cell comprising and expressing an ire1 gene encoding an Ire1 polypeptide; and
(b) mutating the ire1 gene to provide a mutated ire1 gene that encodes a variant Ire1 polypeptide, wherein (a) the variant Ire1 polypeptide comprises an amino acid substitution at position 153 of the *Trichoderma reesei* Ire1 polypeptide of SEQ ID NO: 2; or (b) the variant Ire1 polypeptide comprises an amino acid substitution at a position corresponding to position 153 of the *Trichoderma reesei* Ire1 of SEQ ID NO: 2 and has at least 85% but less than 100% sequence identity to the amino acid sequence of SEQ ID NO: 2.

17. The method of claim 16, wherein the substitution at position 153 or a position corresponding to position 153 is with Thr.

18. The method of claim 16, wherein an Ala at position 153 or a position corresponding to position 153 is substituted with Thr.

19. The method of claim 16, wherein the variant Ire1 polypeptide further comprises a Thr at position 150 of the *Trichoderma reesei* Ire1 polypeptide of SEQ ID NO: 2 or a Thr at a position corresponding to position 150 of the *Trichoderma reesei* Ire1 of SEQ ID NO: 2.

20. The method of claim 16, wherein the filamentous fungal host cell is of a genus selected from the group consisting of *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes* and *Trichoderma*.

* * * * *

SEQUENCE LISTING

<160> NUMBER OF SEQ ID NOS: 52

<210> SEQ ID NO 1
<211> LENGTH: 3793
<212> TYPE: DNA
<213> ORGANISM: Trichoderma reesei

<400> SEQUENCE: 1

```
atgatgcggc gaccccgag ccaaggacga tggtccgcgt cgcatcagaa gctcctcctg      60
gcttttgcct ttattctcat accatggctc caacttgccg atgctcagca gcagcctcag     120
cagccccaga ttcgaattca ctcacaaaga ggcgacgcgc cccttgacaa agtcgccgac     180
gatgccaaca cccgttggta cgcaacacat gctgcaccag acgtgcaccc cgaagcgaag     240
ttcgacaccg tcaacaggaa gcaaaagcag cagtcgaccg cttcgcccca gcaacaccag     300
aaatatcgac gagcccccta tgactacgcc agcaaggaca aggcccagaa ccgatatgcg     360
cagcacccta tccgcgaatc cgagaaacca aactacgtaa aagtccccaa cgatgcgagc     420
gccctcgcaa ctttagctcc ggctcagccc gtccgagcac cacacacctc acgacatcac     480
tggcccagca gcagcgccgc ttctgggctg gcctcgccgc agaatgcgcg gagtctggag     540
gactgggaag ttgaagactt tgttcttctg gcgaccgtcg atggagacct ctatgccagc     600
```

```
gaccgaaaga ccggtcggca cctctggcac ctcgaggtcg accagccagt ggttgaaacc    660
aaacactacc gaacaaacaa ctccgtcctc gacgacgact atcgcccgt cgaccactac     720 atctgggccg tcgagccgag ccgcgatgga gggctctatg tatggatccc cgactccgga    780
gcgggcctcg tcaggaccgg cttcaccatg aagcacctcg ttgaagaact tgctccatac    840
gccggcgacg agccccccgt tgtctatacc ggagacaaga agacgaccat ggtcaccctg    900
gacgccgcta ccgggcgcgt tctcaaatgg tttggctcta gcggctccca agtcaacgaa    960
gccgagagct gccttcggcc caatgccttt gacgacaggg ataccacaga gtgcagctcc   1020
atgggcacaa tcacgctggg aaggaccgag tacacggtgg gcatccagag gcgagacggt   1080
cgccctatcg caaccttgaa gtacgcagaa tggggaccca cacctttga cagcgacctc    1140 taccagcaat accacgcctc gttggacaac cattacatca ccagtcagca cgacgggaga   1200
atttacgcgt ttgacaagtc acaggcagaa acgacctgc ccctctacac ccacaagttt    1260
tcgtctcccg tcgcccgggt cttcgatgtc tgtcgaccgt gggatgcgaa tgcgggaagc   1320
aacccggagc tggtggttct cccccaacct ccaattccag cgcttgatga gagcactgtc   1380
aagatgcgaa gcaacagcat cttcctcaac cagactgaaa gcggcgactg gtatgcgctc   1440
tccggccgtg cgtatccgct tatactcgat gcccccgtgg cccagatctc gcgggacgac   1500
ttgtgggata tggcccatgc ctttgattcc attaacccaa ataagctgtc caaggccctg   1560
gtgggaaccc actttctgaa tcccgtcaag agcaccggtt accatcagcc gccgacgctc   1620
cctgccggcg ccctcgacga gtattacgag gacttggaga acgcctcaaa caatgctcac   1680
gccgtgacaa acactgttcc ggaggagccc accatcatca ccaaagtcaa ggctcttccg   1740
cagagtgctg cgaacagcgt cattgacttt gtcagcaacc ccattctcat cattttcttg   1800
ataggctcct tgatctacaa cgaaaagaag ctgcgacggt cgtatcatcg gttccggact   1860
catggcacaa tcaaggacgt ctatcccttc ttcgttatcg aatctgaggc cggagatgaa   1920
tcaggtgatg acaaggacgg tgtgttccca tcttcgccgt ctccgcgcag tcaacccag    1980 gaccaaaatg cggaagacca cctgtccaga cacaaggtgg agaggaatgc cggcgaccag   2040
gacaaggtca aggacaacag gagcctgcat gacgtttctg acaccttgga accgagcaac   2100
aagactgttg agaaaacggc cgatgtggtc aagcaagtgg atgtagctgg ccctgacgca   2160
ccctcgacgg actccaatgg tgctgcaccg gagaagaaga agaaggctca ccgaggccgt   2220
cgtggcggtg tcaagcacag aaagggtcgg cccaccgacg gctcgcagtc tcatgaaaac   2280
gacccagctc tcactacagt ggacgaggct gtaagcaatg cgaagaagct gggtgaccgg   2340
ccaagcctgg aacccgacgt catgaccatc tacaacgaca tgcaagccgt cacgggctct   2400
gttatcagca tgggaaacat cgaggtcgat acggatgtcg agcttggcat gggcagcaac   2460
ggtactgtcg tatttgctgg ccgattcgat ggcagggacg tcgccgtcaa gagaatgacg   2520
attcagttct acgacattgc cacgcgagaa actaagttgc tgcgcgagag tgacgaccac   2580
cccaatggta atcagccccc tcatcgtttc acccattttc ccttcgctaa cgtaaccact   2640
gtctgcagtc attcggtatt actcacaagt gcagcgaggc gacttcctgt atattgcctt   2700
ggaacgctgc gctgcttcat tggcagatgt cattgaaaag ccgtatgcct ttggtgaatt   2760
ggccaaggct ggacaaaagg acctaccggg cgtcttgtac caaatcacca acggcatcag   2820
ccacttgcac tctctgcgga ttgttcatcg agacttgaag cctcaaaaca tcttggtcaa   2880
cttggacaag gacggcagac caaggctctt ggtgtcggac tttggcctgt gtaagaaact   2940
```

```
ggaggataga cagtcttcgt tcggagcaac gacaggccga gccgctggaa cgtcgggatg    3000
gcgtgccccc gaactgcttc tcgatgacga cggacagaat cccgcagcca tcgatagcag    3060
tacgcacagc ggctctcaca ccatcctcgt gggagacccc aactcgcttt ccaatggagg    3120
gcgagccacg agggccattg acatcttctc ccttggcctt gtcttcttct acgtgctcac    3180
caatggatcc cacccgtttg actgtggcga cagatatatg cgggaggtga acattcgaaa    3240
gggcaactac aatctcgatc cattggacgc tctgggcgac tttgcctacg aagccaagga    3300
tctgattgcg tccatgctcc aggcctctcc caaggcacga cccgactcgc gagaggtcat    3360
ggcccaccct ttcttctggt ctccgaagaa gcgtctggcc tttttgtgcg acgtgtcgga    3420
ttctctggag aaggaggtgc gagatcctcc gtcgcctgcc ttggtcgagc tggagcgaca    3480
tgcgccggag gtcattaagg gagacttctt gaaggtgctc acgcgcgact tgtcgagtc    3540 gctgggcaag cagcgcaagt acaccgggaa caagctgctc gacctgttgc gcgctcttcg    3600
caacaagcgg aatcactacg aagacatgtc ggactgctg aagcgcagcg tgggatcact    3660
gcctgatggg tatcttgctt attggacggt caagttcccg atgctgttgc tgacgtgctg    3720
gaacgtggtg tataatctcg agtgggagaa gacggatcgg ttcagggagt actatgagcc    3780
tgccggattg tag                                                       3793

<210> SEQ ID NO 2
<211> LENGTH: 1243
<212> TYPE: PRT
<213> ORGANISM: Trichoderma reesei

<400> SEQUENCE: 2

Met Met Arg Arg Pro Pro Ser Gln Gly Arg Trp Ser Ala Ser His Gln
1               5                   10                  15

Lys Leu Leu Leu Ala Phe Ala Phe Ile Leu Ile Pro Trp Leu Gln Leu
            20                  25                  30

Ala Asp Ala Gln Gln Gln Pro Gln Gln Pro Gln Ile Arg Ile His Ser
        35                  40                  45

Gln Arg Gly Asp Ala Pro Leu Asp Lys Val Ala Asp Ala Asn Thr
    50                  55                  60

Arg Trp Tyr Ala Thr His Ala Ala Pro Asp Val His Pro Glu Ala Lys
65                  70                  75                  80

Phe Asp Thr Val Asn Arg Lys Gln Lys Gln Gln Ser Thr Ala Ser Pro
                85                  90                  95

Gln Gln His Gln Lys Tyr Arg Arg Ala Pro Tyr Asp Tyr Ala Ser Lys
            100                 105                 110

Asp Lys Ala Gln Asn Arg Tyr Ala Gln His Pro Ile Arg Glu Ser Glu
        115                 120                 125

Lys Pro Asn Tyr Val Lys Val Pro Asn Asp Ala Ser Ala Leu Ala Thr
    130                 135                 140

Leu Ala Pro Ala Gln Pro Val Arg Ala Pro His Thr Ser Arg His His
145                 150                 155                 160

Trp Pro Ser Ser Ser Ala Ala Ser Gly Leu Ala Ser Pro Gln Asn Ala
                165                 170                 175

Arg Ser Leu Glu Asp Trp Glu Val Glu Asp Phe Val Leu Leu Ala Thr
            180                 185                 190

Val Asp Gly Asp Leu Tyr Ala Ser Asp Arg Lys Thr Gly Arg His Leu
        195                 200                 205

Trp His Leu Glu Val Asp Gln Pro Val Val Glu Thr Lys His Tyr Arg
    210                 215                 220
```

```
Thr Asn Asn Ser Val Leu Asp Asp Tyr Arg Pro Val Asp His Tyr
225                 230                 235                 240

Ile Trp Ala Val Glu Pro Ser Arg Asp Gly Leu Tyr Val Trp Ile
                245                 250                 255

Pro Asp Ser Gly Ala Gly Leu Val Arg Thr Gly Phe Thr Met Lys His
            260                 265                 270

Leu Val Glu Glu Leu Ala Pro Tyr Ala Gly Asp Glu Pro Val Val
        275                 280                 285

Tyr Thr Gly Asp Lys Lys Thr Thr Met Val Thr Leu Asp Ala Ala Thr
    290                 295                 300

Gly Arg Val Leu Lys Trp Phe Gly Ser Ser Gly Ser Gln Val Asn Glu
305                 310                 315                 320

Ala Glu Ser Cys Leu Arg Pro Asn Ala Phe Asp Asp Arg Asp Thr Thr
                325                 330                 335

Glu Cys Ser Ser Met Gly Thr Ile Thr Leu Gly Arg Thr Glu Tyr Thr
            340                 345                 350

Val Gly Ile Gln Arg Arg Asp Gly Arg Pro Ile Ala Thr Leu Lys Tyr
        355                 360                 365

Ala Glu Trp Gly Pro Asn Thr Phe Asp Ser Asp Leu Tyr Gln Gln Tyr
370                 375                 380

His Ala Ser Leu Asp Asn His Tyr Ile Thr Ser Gln His Asp Gly Arg
385                 390                 395                 400

Ile Tyr Ala Phe Asp Lys Ser Gln Ala Glu Asn Asp Leu Pro Leu Tyr
                405                 410                 415

Thr His Lys Phe Ser Ser Pro Val Ala Arg Val Phe Asp Val Cys Arg
            420                 425                 430

Pro Trp Asp Ala Asn Ala Gly Ser Asn Pro Glu Leu Val Val Leu Pro
        435                 440                 445

Gln Pro Pro Ile Pro Ala Leu Asp Glu Ser Thr Val Lys Met Arg Ser
    450                 455                 460

Asn Ser Ile Phe Leu Asn Gln Thr Glu Ser Gly Asp Trp Tyr Ala Leu
465                 470                 475                 480

Ser Gly Arg Ala Tyr Pro Leu Ile Leu Asp Ala Pro Val Ala Gln Ile
                485                 490                 495

Ser Arg Asp Asp Leu Trp Asp Met Ala His Ala Phe Asp Ser Ile Asn
            500                 505                 510

Pro Asn Lys Leu Ser Lys Ala Leu Val Gly Thr His Phe Leu Asn Pro
        515                 520                 525

Val Lys Ser Thr Gly Tyr His Gln Pro Pro Thr Leu Pro Ala Gly Ala
    530                 535                 540

Leu Asp Glu Tyr Tyr Glu Asp Leu Glu Asn Ala Ser Asn Asn Ala His
545                 550                 555                 560

Ala Val Thr Asn Thr Val Pro Glu Glu Pro Thr Ile Ile Thr Lys Val
                565                 570                 575

Lys Ala Leu Pro Gln Ser Ala Ala Asn Ser Val Ile Asp Phe Val Ser
            580                 585                 590

Asn Pro Ile Leu Ile Phe Leu Ile Gly Ser Leu Ile Tyr Asn Glu
        595                 600                 605

Lys Lys Leu Arg Arg Ser Tyr His Arg Phe Thr His Gly Thr Ile
    610                 615                 620

Lys Asp Val Tyr Pro Phe Phe Val Ile Glu Ser Glu Ala Gly Asp Glu
625                 630                 635                 640
```

-continued

Ser Gly Asp Asp Lys Asp Gly Val Phe Pro Ser Ser Pro Ser Pro Arg
                645                 650                 655

Ser Gln Pro Gln Asp Gln Asn Ala Glu Asp His Leu Ser Arg His Lys
            660                 665                 670

Val Glu Arg Asn Ala Gly Asp Gln Asp Lys Val Lys Asp Asn Arg Ser
        675                 680                 685

Leu His Asp Val Ser Asp Thr Leu Glu Pro Ser Asn Lys Thr Val Glu
    690                 695                 700

Lys Thr Ala Asp Val Val Lys Gln Val Asp Val Ala Gly Pro Asp Ala
705                 710                 715                 720

Pro Ser Thr Asp Ser Asn Gly Ala Ala Pro Glu Lys Lys Lys Ala
                725                 730                 735

His Arg Gly Arg Arg Gly Gly Val Lys His Arg Lys Gly Arg Pro Thr
                740                 745                 750

Asp Gly Ser Gln Ser His Glu Asn Asp Pro Ala Leu Thr Thr Val Asp
            755                 760                 765

Glu Ala Val Ser Asn Ala Lys Lys Leu Gly Asp Arg Pro Ser Leu Glu
        770                 775                 780

Pro Asp Val Met Thr Ile Tyr Asn Asp Met Gln Ala Val Thr Gly Ser
785                 790                 795                 800

Val Ile Ser Met Gly Asn Ile Glu Val Asp Thr Val Glu Leu Gly
                805                 810                 815

Met Gly Ser Asn Gly Thr Val Val Phe Ala Gly Arg Phe Asp Gly Arg
                820                 825                 830

Asp Val Ala Val Lys Arg Met Thr Ile Gln Phe Tyr Asp Ile Ala Thr
                835                 840                 845

Arg Glu Thr Lys Leu Leu Arg Glu Ser Asp Asp His Pro Asn Val Ile
        850                 855                 860

Arg Tyr Tyr Ser Gln Val Gln Arg Gly Asp Phe Leu Tyr Ile Ala Leu
865                 870                 875                 880

Glu Arg Cys Ala Ala Ser Leu Ala Asp Val Ile Glu Lys Pro Tyr Ala
                885                 890                 895

Phe Gly Glu Leu Ala Lys Ala Gly Gln Lys Asp Leu Pro Gly Val Leu
            900                 905                 910

Tyr Gln Ile Thr Asn Gly Ile Ser His Leu His Ser Leu Arg Ile Val
        915                 920                 925

His Arg Asp Leu Lys Pro Gln Asn Ile Leu Val Asn Leu Asp Lys Asp
    930                 935                 940

Gly Arg Pro Arg Leu Leu Val Ser Asp Phe Gly Leu Cys Lys Lys Leu
945                 950                 955                 960

Glu Asp Arg Gln Ser Ser Phe Gly Ala Thr Thr Gly Arg Ala Ala Gly
                965                 970                 975

Thr Ser Gly Trp Arg Ala Pro Glu Leu Leu Asp Asp Gly Gln
            980                 985                 990

Asn Pro Ala Ala Ile Asp Ser Ser Thr His Ser Gly Ser His Thr Ile
        995                 1000                1005

Leu Val Gly Asp Pro Asn Ser Leu Ser Asn Gly Gly Arg Ala Thr
    1010                1015                1020

Arg Ala Ile Asp Ile Phe Ser Leu Gly Leu Val Phe Phe Tyr Val
    1025                1030                1035

Leu Thr Asn Gly Ser His Pro Phe Asp Cys Gly Asp Arg Tyr Met
    1040                1045                1050

| | | | | | | | | | | |
|---|---|---|---|---|---|---|---|---|---|---|
| Arg | Glu | Val | Asn | Ile | Arg | Lys | Gly | Asn | Tyr | Asn | Leu | Asp | Pro | Leu |
| 1055 | | | | 1060 | | | | | 1065 | |

Arg Glu Val Asn Ile Arg Lys Gly Asn Tyr Asn Leu Asp Pro Leu
        1055                1060                1065

Asp Ala Leu Gly Asp Phe Ala Tyr Glu Ala Lys Asp Leu Ile Ala
        1070                1075                1080

Ser Met Leu Gln Ala Ser Pro Lys Ala Arg Pro Asp Ser Arg Glu
        1085                1090                1095

Val Met Ala His Pro Phe Phe Trp Ser Pro Lys Lys Arg Leu Ala
        1100                1105                1110

Phe Leu Cys Asp Val Ser Asp Ser Leu Glu Lys Glu Val Arg Asp
        1115                1120                1125

Pro Pro Ser Pro Ala Leu Val Glu Leu Glu Arg His Ala Pro Glu
        1130                1135                1140

Val Ile Lys Gly Asp Phe Leu Lys Val Leu Thr Arg Asp Phe Val
        1145                1150                1155

Glu Ser Leu Gly Lys Gln Arg Lys Tyr Thr Gly Asn Lys Leu Leu
        1160                1165                1170

Asp Leu Leu Arg Ala Leu Arg Asn Lys Arg Asn His Tyr Glu Asp
        1175                1180                1185

Met Ser Asp Ser Leu Lys Arg Ser Val Gly Ser Leu Pro Asp Gly
        1190                1195                1200

Tyr Leu Ala Tyr Trp Thr Val Lys Phe Pro Met Leu Leu Leu Thr
        1205                1210                1215

Cys Trp Asn Val Val Tyr Asn Leu Glu Trp Glu Lys Thr Asp Arg
        1220                1225                1230

Phe Arg Glu Tyr Tyr Glu Pro Ala Gly Leu
        1235                1240

<210> SEQ ID NO 3
<211> LENGTH: 3732
<212> TYPE: DNA
<213> ORGANISM: Trichoderma reesei

<400> SEQUENCE: 3

```
atgatgcggc gaccccgag ccaaggacga tggtccgcgt cgcatcagaa gctcctcctg    60
gcttttgcct ttattctcat accatggctc aacttgccg atgctcagca gcagcctcag   120
cagcccagaa ttcgaattca ctcacaaaga ggcgacgcgc ccttgacaa agtcgccgac   180
gatgccaaca cccgttggta cgcaacacat gctgcaccag acgtgcaccc cgaagcgaag   240
ttcgacaccg tcaacaggaa gcaaaagcag cagtcgaccg cttcgcccca gcaacaccag   300
aaatatcgac gagcccccta tgactacgcc agcaaggaca aggcccagaa ccgatatgcg   360
cagcacccta tccgcgaatc cgagaaacca aactacgtaa aagtccccaa cgatgcgagc   420
gccctcgcaa ctttagctcc ggctcagccc gtccgagcac cacacacctc acgacatcac   480
tggcccagca gcagcgccgc ttctgggctg gcctcgccgc agaatgcgcg gagtctggag   540
gactgggaag ttgaagactt tgttcttctg gcgaccgtcg atggagacct ctatgccagc   600
gaccgaaaga ccggtcggca cctctggcac ctcgaggtcg accagccagt ggttgaaacc   660
aaacactacc gaacaaacaa ctccgtcctc gacgacgact atcgcccgt cgaccactac   720
atctgggccg tcgagccgag ccgcgatgga gggctctatg tatggatccc cgactccgga   780
gcgggcctcg tcaggaccgg cttcaccatg aagcacctcg ttgaagaact tgctccatac   840
gccggcgacg agccccccgt tgtctatacc ggagacaaga gacgaccat ggtcaccctg   900
gacgccgcta ccgggcgcgt tctcaaatgg tttggctcta gcggctccca agtcaacgaa   960
```

```
gccgagagct gccttcggcc caatgccttt gacgacaggg ataccacaga gtgcagctcc    1020
atgggcacaa tcacgctggg aaggaccgag tacacggtgg gcatccagag gcgagacggt    1080
cgccctatcg caaccttgaa gtacgcagaa tggggaccca acacctttga cagcgacctc    1140
taccagcaat accacgcctc gttggacaac cattacatca ccagtcagca cgacgggaga    1200
atttacgcgt ttgacaagtc acaggcagaa acgacctgc ccctctacac ccacaagttt     1260
tcgtctcccg tcgcccgggt cttcgatgtc tgtcgaccgt gggatgcgaa tgcgggaagc    1320
aacccggagc tggtggttct cccccaacct ccaattccag cgcttgatga gagcactgtc    1380
aagatgcgaa gcaacagcat cttcctcaac cagactgaaa gcggcgactg gtatgcgctc    1440
tccggccgtg cgtatccgct tatactcgat gccccgtgg cccagatctc gcgggacgac      1500
ttgtgggata tggcccatgc ctttgattcc attaacccaa ataagctgtc caaggccctg    1560
gtgggaaccc actttctgaa tcccgtcaag agcaccggtt accatcagcc gccgacgctc    1620
cctgccggcg ccctcgacga gtattacgag gacttggaga cgcctcaaa caatgctcac     1680 gccgtgacaa acactgttcc ggaggagccc accatcatca ccaaagtcaa ggctcttccg    1740
cagagtgctg cgaacagcgt cattgacttt gtcagcaacc ccattctcat cattttcttg    1800
ataggctcct tgatctacaa cgaaaagaag ctgcgacggt cgtatcatcg gttccggact    1860
catggcacaa tcaaggacgt ctatcccttc ttcgttatcg aatctgaggc cggagatgaa    1920
tcaggtgatg acaaggacgg tgtgttccca tcttcgccgt ctccgcgcag tcaacccag    1980 gaccaaaatg cggaagacca cctgtccaga cacaaggtgg agaggaatgc cggcgaccag    2040
gacaaggtca aggacaacag gagcctgcat gacgtttctg cacccttgga accgagcaac    2100
aagactgttg agaaaacggc cgatgtggtc aagcaagtgg atgtagctgg ccctgacgca    2160
ccctcgacgg actccaatgg tgctgcaccg gagaagaaga agaaggctca ccgaggccgt    2220
cgtggcggtg tcaagcacag aaagggtcgg cccaccgacg gctcgcagtc tcatgaaaac    2280
gacccagctc tcactacagt ggacgaggct gtaagcaatg cgaagaagct gggtgaccgg    2340
ccaagcctgg aacccgacgt catgaccatc tacaacgaca tgcaagccgt cacgggctct    2400
gttatcagca tgggaaacat cgaggtcgat acggatgtcg agcttggcat gggcagcaac    2460
ggtactgtcg tatttgctgg ccgattcgat ggcagggacg tcgccgtcaa gagaatgacg    2520
attcagttct acgacattgc cacgcgagaa actaagttgc tgcgcgagag tgacgaccac    2580
cccaatgtca ttcggtatta ctcacaagtg cagcgaggcg acttcctgta tattgccttg    2640
gaacgctgcg ctgcttcatt ggcagatgtc attgaaaagc cgtatgcctt tggtgaattg    2700
gccaaggctg gacaaaagga cctaccgggc gtcttgtacc aaatcaccaa cggcatcagc    2760
cacttgcact ctctgcggat tgttcatcga gacttgaagc ctcaaaacat cttggtcaac    2820
ttggacaagg acggcagacc aaggctcttg gtgtcggact ttggcctgtg taagaaactg    2880
gaggatagac agtcttcgtt cggagcaacg acaggccgag ccgctggaac gtcgggatgg    2940
cgtgcccccg aactgcttct cgatgacgac ggacagaatc ccgcagccat cgatagcagt    3000
acgcacagcg gctctcacac catcctcgtg ggagacccca actcgctttc caatggaggg    3060
cgagccacga gggccattga catcttctcc cttggccttg tcttcttcta cgtgctcacc    3120
aatggatccc accgtttga ctgtggcgac agatatatgc gggaggtgaa cattcgaaag     3180
ggcaactaca atctcgatcc attggacgct ctgggcgact ttgcctacga agccaaggat    3240
ctgattgcgt ccatgctcca ggcctctccc aaggcacgac ccgactcgcg agaggtcatg    3300
```

-continued

```
gcccacccttt tcttctggtc tccgaagaag cgtctggcct ttttgtgcga cgtgtcggat    3360
tctctggaga aggaggtgcg agatcctccg tcgcctgcct tggtcgagct ggagcgacat    3420
gcgccggagg tcattaaggg agacttcttg aaggtgctca cgcgcgactt tgtcgagtcg    3480
ctgggcaagc agcgcaagta caccgggaac aagctgctcg acctgttgcg cgctcttcgc    3540
aacaagcgga atcactacga agacatgtcg gactcgctga agcgcagcgt gggatcactg    3600
cctgatgggt atcttgctta ttggacggtc aagttcccga tgctgttgct gacgtgctgg    3660
aacgtggtgt ataatctcga gtgggagaag acggatcggt tcagggagta ctatgagcct    3720
gccggattgt ag                                                        3732
```

<210> SEQ ID NO 4
<211> LENGTH: 45
<212> TYPE: DNA
<213> ORGANISM: Artificial Sequence
<220> FEATURE:
<223> OTHER INFORMATION: Artificial DNA Primer

<400> SEQUENCE: 4

```
aaagacaagg cctagttgga gtatttggaa acgcaaccct gaagg              45
```

<210> SEQ ID NO 5
<211> LENGTH: 43
<212> TYPE: DNA
<213> ORGANISM: Artificial Sequence
<220> FEATURE:
<223> OTHER INFORMATION: Artificial DNA Primer

<400> SEQUENCE: 5

```
agtagtcggc caagggcgaa ttctctacgc caggaccgag caa                43
```

<210> SEQ ID NO 6
<211> LENGTH: 58
<212> TYPE: DNA
<213> ORGANISM: Artificial Sequence
<220> FEATURE:
<223> OTHER INFORMATION: Artificial DNA Primer

<400> SEQUENCE: 6

```
ggccttttgc tcacatggtt taaacggcgc gcccgacaaa acaaggctac tgcaggca     58
```

<210> SEQ ID NO 7
<211> LENGTH: 25
<212> TYPE: DNA
<213> ORGANISM: Artificial Sequence
<220> FEATURE:
<223> OTHER INFORMATION: Artificial DNA Primer

<400> SEQUENCE: 7

```
aatactccaa ctaggccttg tcttt                                    25
```

<210> SEQ ID NO 8
<211> LENGTH: 58
<212> TYPE: DNA
<213> ORGANISM: Artificial Sequence
<220> FEATURE:
<223> OTHER INFORMATION: Artificial DNA Primer

<400> SEQUENCE: 8

```
ggccttttgc tcacatggtt taaacggcgc gcccgacaaa acaaggctac tgcaggca     58
```

<210> SEQ ID NO 9
<211> LENGTH: 43

<212> TYPE: DNA
<213> ORGANISM: Artificial Sequence
<220> FEATURE:
<223> OTHER INFORMATION: Artificial DNA Primer

<400> SEQUENCE: 9
agtagtcggc aagggcgaa ttctctacgc caggaccgag caa                43

<210> SEQ ID NO 10
<211> LENGTH: 42
<212> TYPE: DNA
<213> ORGANISM: Artificial Sequence
<220> FEATURE:
<223> OTHER INFORMATION: Artificial DNA Primer

<400> SEQUENCE: 10
cacatggttt aaacggcgcg cccgtctggt cctctctttt gt                42

<210> SEQ ID NO 11
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 11
tgtggtgttc ggacggtctg agccggagct aaagttgcga                   40

<210> SEQ ID NO 12
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 12
cagaccgtcc gaacaccaca cacctcacga catcactggc                   40

<210> SEQ ID NO 13
<211> LENGTH: 41
<212> TYPE: DNA
<213> ORGANISM: Artificial Sequence
<220> FEATURE:
<223> OTHER INFORMATION: Artificial DNA Primer

<400> SEQUENCE: 13
cccttcaggg ttgcgtttcc acaacagaag ctgaaacaat t                 41

<210> SEQ ID NO 14
<211> LENGTH: 47
<212> TYPE: DNA
<213> ORGANISM: Artificial Sequence
<220> FEATURE:
<223> OTHER INFORMATION: Artificial DNA Primer

<400> SEQUENCE: 14
cttccttgaa ctctcagatc tcccgggaag aaagaaaagg aagagaa           47

<210> SEQ ID NO 15
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 15
ccatatttaa atcctgcagg ctcgacatat cgccagggag                                 40

<210> SEQ ID NO 16
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 16
aattgtttca gcttctgttg tggaaacgca accctgaagg                                 40

<210> SEQ ID NO 17
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 17
tctttcttcc cgggagatct gagagttcaa ggaagaaaca                                 40

<210> SEQ ID NO 18
<211> LENGTH: 41
<212> TYPE: DNA
<213> ORGANISM: Artificial Sequence
<220> FEATURE:
<223> OTHER INFORMATION: Artificial DNA Primer

<400> SEQUENCE: 18
ctccctggcg atatgtcgag cctgcaggat ttaaatatgg c                               41

<210> SEQ ID NO 19
<211> LENGTH: 45
<212> TYPE: DNA
<213> ORGANISM: Artificial Sequence
<220> FEATURE:
<223> OTHER INFORMATION: Artificial DNA Primer

<400> SEQUENCE: 19
caaaagagag gaccagacgg gcgcgccgtt taaaccatgt gagca                           45

<210> SEQ ID NO 20
<211> LENGTH: 39
<212> TYPE: DNA
<213> ORGANISM: Artificial Sequence
<220> FEATURE:
<223> OTHER INFORMATION: Artificial DNA Primer

<400> SEQUENCE: 20
aagcggtttc cgttgccttc gaattcgaca gagctgcga                                  39

<210> SEQ ID NO 21
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 21
tgtggtgttc ggacgggctg agccggagct aaagttgcga                                 40

<210> SEQ ID NO 22

```
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 22
cagcccgtcc gaacaccaca cacctcacga catcactggc                              40

<210> SEQ ID NO 23
<211> LENGTH: 40
<212> TYPE: DNA
<213> ORGANISM: Artificial Sequence
<220> FEATURE:
<223> OTHER INFORMATION: Artificial DNA Primer

<400> SEQUENCE: 23
agattgtagt tgccctttcg aatgttcacc tcccgcatat                              40

<210> SEQ ID NO 24
<211> LENGTH: 20
<212> TYPE: DNA
<213> ORGANISM: Artificial Sequence
<220> FEATURE:
<223> OTHER INFORMATION: Artificial DNA Primer

<400> SEQUENCE: 24
tgtcgaggat gtgctggagg                                                   20

<210> SEQ ID NO 25
<211> LENGTH: 20
<212> TYPE: DNA
<213> ORGANISM: Artificial Sequence
<220> FEATURE:
<223> OTHER INFORMATION: Artificial DNA Primer

<400> SEQUENCE: 25
acctgccgta gaaccgaaga                                                   20

<210> SEQ ID NO 26
<211> LENGTH: 23
<212> TYPE: DNA
<213> ORGANISM: Artificial Sequence
<220> FEATURE:
<223> OTHER INFORMATION: Artificial DNA Primer

<400> SEQUENCE: 26
cttatcagcg gccagttctt ccc                                               23

<210> SEQ ID NO 27
<211> LENGTH: 20
<212> TYPE: DNA
<213> ORGANISM: Artificial Sequence
<220> FEATURE:
<223> OTHER INFORMATION: Artificial DNA Primer

<400> SEQUENCE: 27
gactcgcata agatggcgac                                                   20

<210> SEQ ID NO 28
<211> LENGTH: 1563
<212> TYPE: DNA
<213> ORGANISM: Polyporous pinsitus
```

<400> SEQUENCE: 28

```
atgtcgaggt tcactctct tctcgctttc gtcgttgctt cccttacggc tgtggcccac    60
gctggtatcg gtcccgtcgc cgacctaacc atcaccaacg cagcggtcag ccccgacggg   120
ttttctcgcc aggccgtcgt cgtgaacggc ggcacccctg ccctctcat caccggtaac   180
atgggggatc gcttccagct caatgtcatc gacaacctta ccaaccacac gatgctgaag   240
agcacgagta ttcactggca cggttttcttc agaagggta ccactgggc cgacggtccc    300
gccttcatca accagtgccc gatctcatct ggtcactcgt tcctgtacga cttccaggtt   360
cctgaccagg ctggtacctt ctggtatcac agtcacttgt ctacgcagta ctgtgatggt   420
ttgagggtc cgttcgttgt ttacgacccg aatgacccgg ccgccgacct gtacgacgtc    480
gacaacgacg acactgtcat tacccttgtg gattggtacc acgtcgccgc gaagctgggc   540
cccgcattcc ctctcggcgc cgacgccacc ctcatcaacg gtaagggacg ctcccccagc   600
acgaccaccg cggacctctc agttatcagc gtcaccccgg gtaaacgcta ccgtttccgc   660
ctggtgtccc tgtcgtgcga ccccaactac acgttcagca tcgatggtca acatgacg    720
atcatcgaga ccgactcaat caacacggcg ccctcgtcg tcgactccat tcagatcttc    780
gccgcccagc gttactcctt cgtgctcgag gccaaccagg ccgtcgacaa ctactggatt   840
cgcgccaacc cgaacttcgg taacgtcggg ttcaccggcg gcattaactc ggctatcctc   900
cgctacgatg gtgccgctgc cgtggagccc accaccacgc aaaccacgtc gactgcgccg   960
ctcaacgagg tcaacctgca cccgctggtt accaccgctg tgcctggctc gcccgtcgct  1020
ggtggtgtcg acctggccat caacatggcg ttcaacttca acggcaccaa cttcttcatc  1080
aacggcgcgt ctttcacgcc cccgaccgtg cctgtcctgc tccagatcat cagcggcgcg  1140
cagaacgcgc aggacctcct gccctccggt agcgtctact cgcttccctc gaacgccgac  1200
atcgagatct ccttccccgc caccgccgcc gccccggtg cgccccaccc cttccacttg  1260
cacgggcacg cgttcgcggt cgtccgcagc gccggcagca cggtttacaa ctacgacaac  1320
cccatcttcc gcgacgtcgt cagcacgggg acgcctgcgg ccggtgacaa cgtcaccatc  1380
cgcttccgca ccgacaaccc cggcccgtgg ttcctccact gccacatcga cttccacctc  1440
gaggccggct cgccgtcgt gttcgcggag gacatccccg acgtcgcgtc ggcgaacccc  1500
gtcccccagg cgtggtccga cctctgcccg acctacgacg cgctcgaccc gagcgaccag  1560
tag                                                                1563
```

<210> SEQ ID NO 29
<211> LENGTH: 520
<212> TYPE: PRT
<213> ORGANISM: Trichoderma reesei

<400> SEQUENCE: 29

```
Met Ser Arg Phe His Ser Leu Leu Ala Phe Val Val Ala Ser Leu Thr
1               5                   10                  15

Ala Val Ala His Ala Gly Ile Gly Pro Val Ala Asp Leu Thr Ile Thr
            20                  25                  30

Asn Ala Ala Val Ser Pro Asp Gly Phe Ser Arg Gln Ala Val Val Val
        35                  40                  45

Asn Gly Gly Thr Pro Gly Pro Leu Ile Thr Gly Asn Met Gly Asp Arg
    50                  55                  60

Phe Gln Leu Asn Val Ile Asp Asn Leu Thr Asn His Thr Met Leu Lys
65                  70                  75                  80
```

-continued

```
Ser Thr Ser Ile His Trp His Gly Phe Phe Gln Lys Gly Thr Asn Trp
            85                  90                  95

Ala Asp Gly Pro Ala Phe Ile Asn Gln Cys Pro Ile Ser Ser Gly His
        100                 105                 110

Ser Phe Leu Tyr Asp Phe Gln Val Pro Asp Gln Ala Gly Thr Phe Trp
        115                 120                 125

Tyr His Ser His Leu Ser Thr Gln Tyr Cys Asp Gly Leu Arg Gly Pro
        130                 135                 140

Phe Val Val Tyr Asp Pro Asn Asp Pro Ala Ala Asp Leu Tyr Asp Val
145                 150                 155                 160

Asp Asn Asp Asp Thr Val Ile Thr Leu Val Asp Trp Tyr His Val Ala
                165                 170                 175

Ala Lys Leu Gly Pro Ala Phe Pro Leu Gly Ala Asp Ala Thr Leu Ile
                180                 185                 190

Asn Gly Lys Gly Arg Ser Pro Ser Thr Thr Thr Ala Asp Leu Ser Val
            195                 200                 205

Ile Ser Val Thr Pro Gly Lys Arg Tyr Arg Phe Arg Leu Val Ser Leu
        210                 215                 220

Ser Cys Asp Pro Asn Tyr Thr Phe Ser Ile Asp Gly His Asn Met Thr
225                 230                 235                 240

Ile Ile Glu Thr Asp Ser Ile Asn Thr Ala Pro Leu Val Val Asp Ser
                245                 250                 255

Ile Gln Ile Phe Ala Ala Gln Arg Tyr Ser Phe Val Leu Glu Ala Asn
            260                 265                 270

Gln Ala Val Asp Asn Tyr Trp Ile Arg Ala Asn Pro Asn Phe Gly Asn
        275                 280                 285

Val Gly Phe Thr Gly Gly Ile Asn Ser Ala Ile Leu Arg Tyr Asp Gly
290                 295                 300

Ala Ala Ala Val Glu Pro Thr Thr Gln Thr Thr Ser Thr Ala Pro
305                 310                 315                 320

Leu Asn Glu Val Asn Leu His Pro Leu Val Thr Thr Ala Val Pro Gly
                325                 330                 335

Ser Pro Val Ala Gly Gly Val Asp Leu Ala Ile Asn Met Ala Phe Asn
            340                 345                 350

Phe Asn Gly Thr Asn Phe Phe Ile Asn Gly Ala Ser Phe Thr Pro Pro
        355                 360                 365

Thr Val Pro Val Leu Leu Gln Ile Ile Ser Gly Ala Gln Asn Ala Gln
    370                 375                 380

Asp Leu Leu Pro Ser Gly Ser Val Tyr Ser Leu Pro Ser Asn Ala Asp
385                 390                 395                 400

Ile Glu Ile Ser Phe Pro Ala Thr Ala Ala Pro Gly Ala Pro His
                405                 410                 415

Pro Phe His Leu His Gly His Ala Phe Ala Val Val Arg Ser Ala Gly
                420                 425                 430

Ser Thr Val Tyr Asn Tyr Asp Asn Pro Ile Phe Arg Asp Val Val Ser
        435                 440                 445

Thr Gly Thr Pro Ala Ala Gly Asp Asn Val Thr Ile Arg Phe Arg Thr
    450                 455                 460

Asp Asn Pro Gly Pro Trp Phe Leu His Cys His Ile Asp Phe His Leu
465                 470                 475                 480

Glu Ala Gly Phe Ala Val Val Phe Ala Glu Asp Ile Pro Asp Val Ala
                485                 490                 495
```

Ser Ala Asn Pro Val Pro Gln Ala Trp Ser Asp Leu Cys Pro Thr Tyr
            500                 505                 510

Asp Ala Leu Asp Pro Ser Asp Gln
        515                 520

<210> SEQ ID NO 30
<211> LENGTH: 34
<212> TYPE: DNA
<213> ORGANISM: Artificial Sequence
<220> FEATURE:
<223> OTHER INFORMATION: Artificial DNA Primer

<400> SEQUENCE: 30
accgcggact gcgcaccatg tcgaggtttc actc                                34

<210> SEQ ID NO 31
<211> LENGTH: 34
<212> TYPE: DNA
<213> ORGANISM: Artificial Sequence
<220> FEATURE:
<223> OTHER INFORMATION: Artificial DNA Primer

<400> SEQUENCE: 31
gccacggagc ttaattacta ctggtcgctc gggt                                34

<210> SEQ ID NO 32
<211> LENGTH: 21
<212> TYPE: DNA
<213> ORGANISM: Artificial Sequence
<220> FEATURE:
<223> OTHER INFORMATION: Artificial DNA Primer

<400> SEQUENCE: 32
cccaagaaga agcgcaaggt c                                              21

<210> SEQ ID NO 33
<211> LENGTH: 7
<212> TYPE: PRT
<213> ORGANISM: Artificial Sequence
<220> FEATURE:
<223> OTHER INFORMATION: Artificial Amino Acid

<400> SEQUENCE: 33

Pro Lys Lys Lys Arg Lys Val
1               5

<210> SEQ ID NO 34
<211> LENGTH: 42
<212> TYPE: DNA
<213> ORGANISM: Artificial Sequence
<220> FEATURE:
<223> OTHER INFORMATION: Artificial DNA Primer

<400> SEQUENCE: 34
gaacgccccc tactccatct tcgccatcaa gaacggcccc aa                       42

<210> SEQ ID NO 35
<211> LENGTH: 41
<212> TYPE: DNA
<213> ORGANISM: Artificial Sequence
<220> FEATURE:
<223> OTHER INFORMATION: Artificial DNA Primer

<400> SEQUENCE: 35
gaccttgcgc ttcttcttgg ggatgcggcg gttgatgtag g                        41

```
<210> SEQ ID NO 36
<211> LENGTH: 41
<212> TYPE: DNA
<213> ORGANISM: Artificial Sequence
<220> FEATURE:
<223> OTHER INFORMATION: Artificial DNA Primer

<400> SEQUENCE: 36
cccaagaaga agcgcaaggt ctgagtcgag attatccaag g       41

<210> SEQ ID NO 37
<211> LENGTH: 41
<212> TYPE: DNA
<213> ORGANISM: Artificial Sequence
<220> FEATURE:
<223> OTHER INFORMATION: Artificial DNA Primer

<400> SEQUENCE: 37
gtttaaactc taggatgcat gcaagtgagg ctattgccta t       41

<210> SEQ ID NO 38
<211> LENGTH: 60
<212> TYPE: DNA
<213> ORGANISM: Artificial Sequence
<220> FEATURE:
<223> OTHER INFORMATION: Artificial DNA Primer

<400> SEQUENCE: 38
ctattccgag ttcctattct ctagaaagta taggaacttc gaattctagg ctaggtatgc   60

<210> SEQ ID NO 39
<211> LENGTH: 25
<212> TYPE: DNA
<213> ORGANISM: Artificial Sequence
<220> FEATURE:
<223> OTHER INFORMATION: Artificial DNA Primer

<400> SEQUENCE: 39
atcgcccagc agttagtagg gtccc                        25

<210> SEQ ID NO 40
<211> LENGTH: 65
<212> TYPE: DNA
<213> ORGANISM: Artificial Sequence
<220> FEATURE:
<223> OTHER INFORMATION: Artificial DNA Primer

<400> SEQUENCE: 40
ataggaactt cagatatcca tcacactggg agtaccattt aattctattt gtgtttgatc   60
gagac                                             65

<210> SEQ ID NO 41
<211> LENGTH: 33
<212> TYPE: DNA
<213> ORGANISM: Artificial Sequence
<220> FEATURE:
<223> OTHER INFORMATION: Artificial DNA Primer

<400> SEQUENCE: 41
cgaactgggg catggtgatg tctgctcaag cgg               33

<210> SEQ ID NO 42
<211> LENGTH: 34
<212> TYPE: DNA
<213> ORGANISM: Artificial Sequence
```

```
<220> FEATURE:
<223> OTHER INFORMATION: Artificial DNA Primer

<400> SEQUENCE: 42
gcagacatca ccatgcccca gttcgatatc ctct                          34

<210> SEQ ID NO 43
<211> LENGTH: 37
<212> TYPE: DNA
<213> ORGANISM: Artificial Sequence
<220> FEATURE:
<223> OTHER INFORMATION: Artificial DNA Primer

<400> SEQUENCE: 43
cttcttgagg gaggcctcca ggatggtggc cttctgg                       37

<210> SEQ ID NO 44
<211> LENGTH: 20
<212> TYPE: DNA
<213> ORGANISM: Artificial Sequence
<220> FEATURE:
<223> OTHER INFORMATION: Artificial DNA Primer

<400> SEQUENCE: 44
caagggcgaa ttctgcattg                                          20

<210> SEQ ID NO 45
<211> LENGTH: 60
<212> TYPE: DNA
<213> ORGANISM: Artificial Sequence
<220> FEATURE:
<223> OTHER INFORMATION: Artificial DNA Primer

<400> SEQUENCE: 45
gaagttccta tactttctag agaataggaa ctcggaatag gaacttcaag atgaattcgc    60

<210> SEQ ID NO 46
<211> LENGTH: 45
<212> TYPE: DNA
<213> ORGANISM: Artificial Sequence
<220> FEATURE:
<223> OTHER INFORMATION: Artificial DNA Primer

<400> SEQUENCE: 46
ctagaaagta taggaacttc aagctttgga aacgcaaccc tgaag              45

<210> SEQ ID NO 47
<211> LENGTH: 41
<212> TYPE: DNA
<213> ORGANISM: Artificial Sequence
<220> FEATURE:
<223> OTHER INFORMATION: Artificial DNA Primer

<400> SEQUENCE: 47
caatgcagaa ttcgcccttg cctcaatcct gggaagaact g                  41

<210> SEQ ID NO 48
<211> LENGTH: 19
<212> TYPE: DNA
<213> ORGANISM: Artificial Sequence
<220> FEATURE:
<223> OTHER INFORMATION: Artificial DNA Primer

<400> SEQUENCE: 48
gttcttccca ggattgagg                                           19
```

-continued

```
<210> SEQ ID NO 49
<211> LENGTH: 22
<212> TYPE: DNA
<213> ORGANISM: Artificial Sequence
<220> FEATURE:
<223> OTHER INFORMATION: Artificial DNA Primer

<400> SEQUENCE: 49
ggtactggga tacacgaaga gc                                              22

<210> SEQ ID NO 50
<211> LENGTH: 21
<212> TYPE: DNA
<213> ORGANISM: Artificial Sequence
<220> FEATURE:
<223> OTHER INFORMATION: Artificial DNA Primer

<400> SEQUENCE: 50
atcagtacag ccatgttgca c                                               21

<210> SEQ ID NO 51
<211> LENGTH: 21
<212> TYPE: DNA
<213> ORGANISM: Artificial Sequence
<220> FEATURE:
<223> OTHER INFORMATION: Artificial DNA Primer

<400> SEQUENCE: 51
gagaagactt tggacgcagt g                                               21

<210> SEQ ID NO 52
<211> LENGTH: 25
<212> TYPE: DNA
<213> ORGANISM: Artificial Sequence
<220> FEATURE:
<223> OTHER INFORMATION: Artificial DNA Primer

<400> SEQUENCE: 52
atgataccta ctgataccga caacc                                           25
```